United States Patent [19]

Ozaki et al.

[11] Patent Number: 5,642,242
[45] Date of Patent: Jun. 24, 1997

[54] PROCESSING SYSTEM FOR DIGITAL VIDEO SIGNAL

[75] Inventors: Hidetoshi Ozaki; Minoru Otani, both of Yokohama; Hironori Akasaka, Tokyo; Masaki Mori, Yokosuka, all of Japan

[73] Assignee: Victor Company of Japan, Ltd., Yokohama, Japan

[21] Appl. No.: 264,675

[22] Filed: Jun. 23, 1994

[30] Foreign Application Priority Data

Jun. 30, 1993 [JP] Japan ................................. 5-186894
Jul. 16, 1993 [JP] Japan ................................. 5-198970

[51] Int. Cl.⁶ ........................ G11B 5/09; G11B 5/00; H04N 5/76; H04N 5/78
[52] U.S. Cl. ........................ 360/48; 360/32; 360/40; 386/112; 386/124
[58] Field of Search ........................ 360/32, 48, 53, 360/63, 40, 33.1; 358/335; 341/67

[56] References Cited

U.S. PATENT DOCUMENTS

| | | | |
|---|---|---|---|
| 5,309,290 | 5/1994 | Sugiyama et al. | 360/32 |
| 5,309,292 | 5/1994 | Takakura | 360/48 |
| 5,319,457 | 6/1994 | Nakahashi et al. | 348/387 |
| 5,446,597 | 8/1995 | Matsumi et al. | 360/48 |

FOREIGN PATENT DOCUMENTS

| | | |
|---|---|---|
| 0469842 | 2/1992 | European Pat. Off. . |
| 0487282 | 5/1992 | European Pat. Off. . |
| 0510929 | 10/1992 | European Pat. Off. . |
| 0546691 | 6/1993 | European Pat. Off. . |
| 0552049 | 7/1993 | European Pat. Off. . |
| 0577327 | 1/1994 | European Pat. Off. . |
| 4-290087 | 10/1992 | Japan . |

OTHER PUBLICATIONS

Signal Processing of HDTV, III, Sep. 1991, Turin, IT, pp. 523-530, XP000379990, Chiang et al 'Compatible Coding of Digital Interlaced HDTV Using Prediction of the Even Field from the Odd Field'.

1993 Picture Coding Symposium, Mar. 1993, Lausannce, CH, pp. 1-2, XP000346319, Kieu et al "Layered Codec with an Effective Error Concealment Technique".

Primary Examiner—W. Chris Kim
Assistant Examiner—Regina Y. Neal
Attorney, Agent, or Firm—Lowe, Price, LeBlanc & Becker

[57] ABSTRACT

In an encoding circuit for a digital video signal, a digital video signal is subjected to given orthogonal transform to be converted into corresponding conversion data. Components of the conversion data are scanned in a given order to generate a main data sequence from the conversion data. The main data sequence is separated into at least two sub data sequences. A first of the two sub data sequences is encoded into corresponding words of a given variable-length code. A second of the two sub data sequences is encoded into corresponding words of the variable-length code.

7 Claims, 18 Drawing Sheets

PROCESSING SYSTEM FOR DIGITAL VIDEO SIGNAL

BACKGROUND OF THE INVENTION

1. Field of the Invention

This invention generally relates to a processing system for a digital video signal. This invention particularly relates to an encoder and a decoder for processing a digital video signal in a digital recording and reproducing apparatus such as a digital VTR (video tape recorder).

2. Description of the Prior Art

The recording sections of digital VTR's include a signal processor for compressing a video signal by an efficient encoding technique using orthogonal transform. Such a signal processor has a series combination of an orthogonal transform circuit, a variable-length encoding circuit, an error correction encoding circuit, and a record encoding circuit.

The orthogonal transform circuit subjects an input digital video signal to given orthogonal transform such as two-dimensional DCT (discrete cosine transform). For example, pixel-corresponding components of the input video signal which form one field or one frame are grouped into a given number of blocks each having 8 by 8 adjacent pixels (8 pixels in the horizontal direction and 8 pixels in the vertical direction) according to the JPEG standards. The orthogonal transform is executed on every block. The orthogonal transform generates 8 by 8 pieces of data (DCT coefficient data) per block. Zigzag scanning rearranges 8 by 8 pieces of data into a sequence of data which is outputted from the orthogonal transform circuit to the variable-length encoding circuit.

The variable-length encoding circuit has a section for quantizing the output data of the orthogonal transform circuit by referring to a plurality of discrete quantization levels. The variable-length encoding circuit also has a section for encoding the quantization-resultant data into words of a given variable-length code such as a two-dimensional Huffman code. The variable-length encoding circuit outputs the code data to the error correction encoding circuit.

The error correction encoding circuit subjects the output data from the variable-length encoding circuit to given encoding such as Reed-Solomn encoding for error correction. The error correction encoding circuit is followed by the record encoding circuit. The record encoding circuit subjects the output data from the error correction encoding circuit to given encoding such as I-NRZI encoding for recording.

The rate of compression of video data by such a signal processor affects the quality of an image represented by the processing-resultant data. A low compression rate and a high compression rate are chosen for a high-quality image and a low-quality image respectively. As the compression rate decreases and hence the image quality increases, the signal processor is required to handle a greater number of bits of data per unit time.

The reproducing sections of the digital VTR's include a series combination of circuits having functions inverse with respect to the functions of the circuits in the recording sections thereof.

SUMMARY OF THE INVENTION

It is a first object of this invention to provide an improved encoding circuit for a digital video signal.

It is a second object of this invention to provide an improved decoding circuit for a digital video signal.

It is a third object of this invention to provide an improved recording apparatus for a digital video signal.

It is a fourth object of this invention to provide an improved reproducing apparatus for a digital video signal.

It is a fifth object of this invention to provide a processing circuit for a digital video signal.

A first aspect of this invention provides an encoding circuit for a digital video signal which comprises means for subjecting a digital video signal to given orthogonal transform to convert the digital video signal into corresponding conversion data; means for scanning components of the conversion data in a given order to generate a main data sequence from the conversion data; means for separating the main data sequence into at least two sub data sequences; means for encoding first one of the two sub data sequences into corresponding words of a given variable-length code; and means for encoding second one of the two sub data sequences into corresponding words of the variable-length code.

A second aspect of this invention provides a decoding circuit for a digital video signal which comprises means for decoding words of a given variable-length code into a corresponding first sub data sequence; means for decoding words of the variable-length code into a corresponding second sub data sequence; means for combining the first sub data sequence and the second sub data sequence into a main data sequence; and means for converting the main data sequence into a corresponding digital video signal.

A third aspect of this invention provides an apparatus for recording image information on a tape via a plurality of recording heads, wherein every unit of the image information is divided and recorded on a plurality of tracks in the tape via the recording heads, the apparatus comprising means for subjecting a digital video signal to given orthogonal transform to convert the digital video signal into corresponding conversion data; means for scanning components of the conversion data in a given order to generate a main data sequence from the conversion data; means for separating the main data sequence into at least two sub data sequences; means for encoding the sub data sequences into at least two encoded data sequences respectively; means for rearranging the encoded data sequences into at least two final data sequences in correspondence with track scanning by the recording heads so that one of the encoded data sequences which has a component with a lowest order regarding the orthogonal transform will be recorded on a given region of a track in the tape; and means for feeding the final data sequences to the recording heads respectively.

A fourth aspect of this invention provides an apparatus for reproducing image information from a tape via a plurality of reproducing heads, the apparatus comprising means for rearranging output data sequences from the reproducing heads into at least two first data sequences; means for decoding the first data sequences into at least two second data sequences respectively; means for combining the second data sequences into a third data sequence; and means for subjecting the third data sequence to given inverse orthogonal transform to convert the third data sequence into a corresponding digital video signal.

A fifth aspect of this invention provides a tape on which image information is recorded by the previously-indicated apparatus in a given helical scanning format.

A sixth aspect of this invention provides a processing circuit for a digital video signal which comprises first means for detecting an error or a chance of an error in a first data sequence; second means for detecting an error or a chance of an error in a second data sequence different from the first data sequence; third means for combining the first data sequence and the second data sequence into a third data sequence; fourth means for feeding a predetermined data sequence to the third means in place of the first data sequence when the first means detects an error or a chance of an error in the first data sequence; and fifth means for feeding the predetermined data sequence to the third means in place of the second data sequence when the second means detects an error or a chance of an error in the second data sequence.

BRIEF DESCRIPTION OF THE DRAWINGS

FIGS. 1 and 1A are a block diagram of a digital VTR according to a first embodiment of this invention.

FIG. 4 is a diagram of a first separation-resultant data sequence in the digital VTR of FIGS. 1 and 1A.

FIG. 5 is a diagram of a second separation-resultant data sequence in the digital VTR of FIGS. 1 and 1A.

FIG. 6 is a diagram of conditions of two-dimensional Huffman encoding in the digital VTR of FIGS. 1 and 1A.

FIGS. 13 and 13A are a diagram of conditions of combining a O-data sequence and an even-number data sequence in the digital VTR of FIGS. 7 and 7A.

FIGS. 21 and 21A are a block diagram of a digital VTR according to a fourth embodiment of this invention.

DESCRIPTION OF THE FIRST PREFERRED EMBODIMENT

Figure 1:
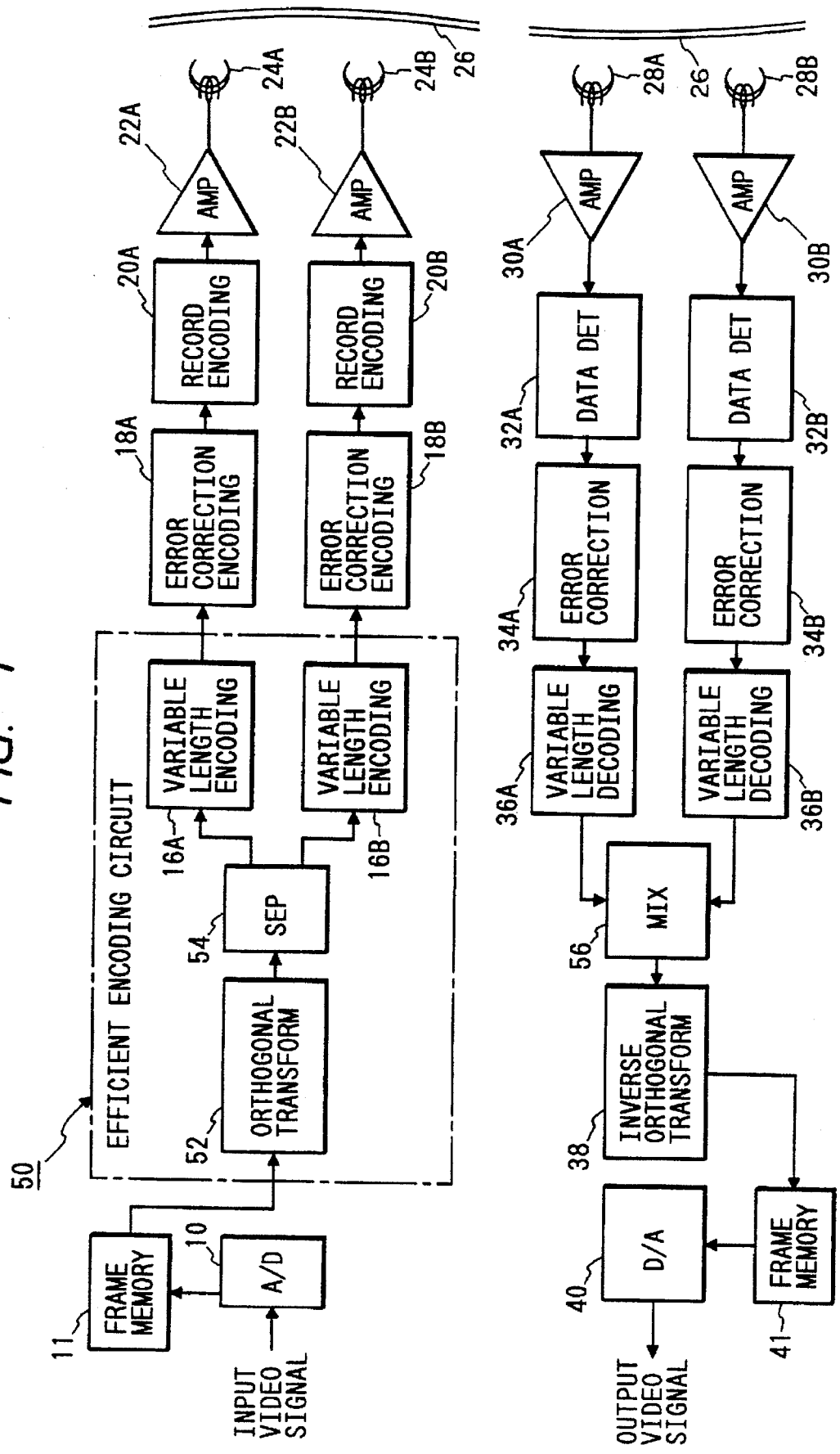
Figure 2:
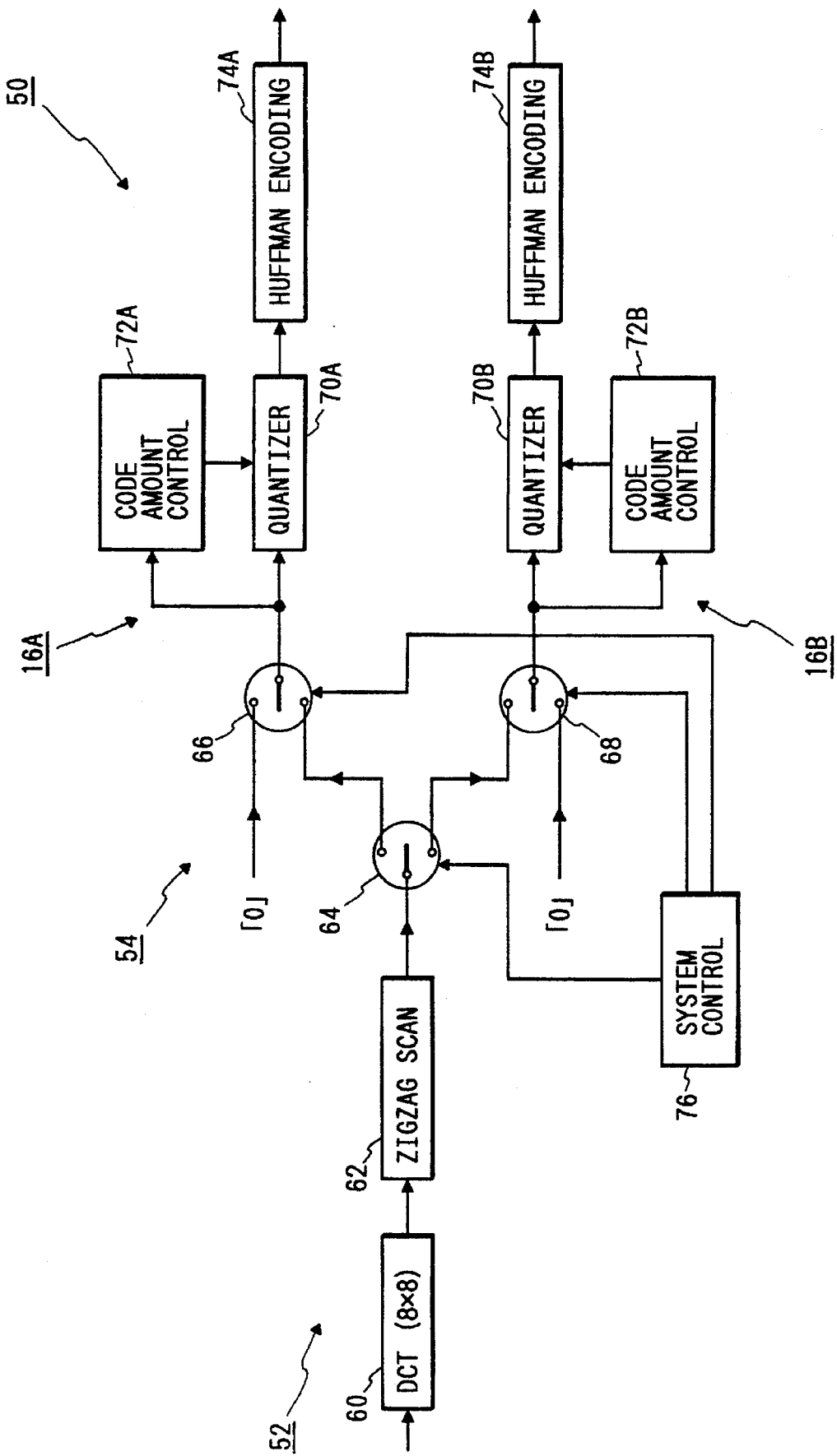
FIG. 2 is a block diagram of an efficient encoding circuit in FIGS. 1 and 1A.

With reference to FIG. 1, a recording section of a signal processing circuit in a digital VTR (video tape recorder) includes an A/D converter 10 and a frame memory 11 followed by an efficient encoding circuit 50. The efficient encoding circuit 50 includes an orthogonal transform circuit 52, a separation circuit 54, and variable-length encoding circuits 16A and 16B. The efficient encoding circuit 50 has a structure such as shown in FIG. 2.

The output side of the variable-length encoding circuit 16A is sequentially followed by an error correction encoding circuit 18A, a record encoding circuit 20A, an amplifier 22A, and a recording head 24A. The output side of the variable-length encoding circuit 16B is sequentially followed by an error correction encoding circuit 18B, a record encoding circuit 20B, an amplifier 22B, and a recording head 24B. It is preferable that the recording heads 24A and 24B have azimuths opposite to each other.

A reproducing section of the signal processing circuit in the digital VTR includes a reproducing head 28A sequentially followed by an amplifier 30A, a data detection circuit 32A, an error correction circuit 34A, and a variable-length decoding circuit 36A. The reproducing section of the digital VTR also includes a reproducing head 28B sequentially followed by an amplifier 30B, a data detection circuit 32B, an error correction circuit 34B, and a variable-length decoding circuit 36B.

The output sides of the variable-length decoding circuits 36A and 36B are connected to input terminals of a mixing circuit 56 which is sequentially followed by an inverse orthogonal transform circuit 38, a frame memory 41, and a D/A converter 40.

As shown in FIG. 2, the efficient encoding circuit 50 includes a DCT (discrete cosine transform) circuit 60 and a zigzag scanning circuit 62 composing the orthogonal transform circuit 52 of FIG. 1. The DCT circuit 60 follows the frame memory 11 of FIG. 1. The zigzag scanning circuit 62 follows the DCT circuit 60.

In the efficient encoding circuit 50 of FIG. 2, the output side of the zigzag scanning circuit 62 is connected to a common input side of a data separation switch 64. The switch 64 has a first output side and a second output side. The input side of the switch 64 is selectively connected to the first output side or the second output side thereof in response to a switch control signal fed from a system controller 76. The first output side of the switch 64 is connected to a first input side of a O-data adding switch 66. The second output side of the switch 64 is connected to a first input side of a 0-data adding circuit 68. Second input sides of the switches 66 and 68 receive data in a logic state "0" from a data source (not shown). The switch 66 has a common output side. The output side of the switch 66 is selectively connected to the first input side or the second input side thereof in response to a switch control signal fed from the system controller 76. The switch 68 has a common output side. The output side of the switch 68 is selectively connected to the first input side or the second input side thereof in response to a switch control signal fed from the system controller 76. The switches 64, 66, and 68 compose the separation circuit 54 of FIG. 1.

In the efficient encoding circuit 50 of FIG. 2, the output side of the switch 66 is connected to the input sides of a quantizer 70A and a code amount control circuit 72A. The output side of the code amount control circuit 72A is connected to the control terminal of the quantizer 70A. The output side of the quantizer 70A is connected to the input side of a two-dimensional Huffman encoding circuit 74A which is followed by the error correction encoding circuit 18A of FIG. 1. The quantizer 70A, the code amount control circuit 72A, and the two-dimensional Huffman encoding circuit 74A compose the variable-length encoding circuit 16A of FIG. 1.

On the other hand, the output side of the switch 68 is connected to the input sides of a quantizer 70B and a code amount control circuit 72B. The output side of the code amount control circuit 72B is connected to the control terminal of the quantizer 70B. The output side of the quantizer 70B is connected to the input side of a two-dimensional Huffman encoding circuit 74B which is followed by the error correction encoding circuit 18B of FIG. 1. The quantizer 70B, the code amount control circuit 72B, and the two-dimensional Huffman encoding circuit 74B compose the variable-length encoding circuit 16B of FIG. 1.

As previously described, the system controller 76 serves to control the switches 64, 66, and 68. In addition, the system controller 76 operates to control other portions of the efficient encoding circuit 50.

The signal processing circuit of FIGS. 1 and 2 operates as follows. An analog video signal is changed by the A/D converter 10 into a corresponding digital video signal written into the frame memory 11. The digital video signal is read from the frame memory 11, and is fed to the DCT circuit 60 in the orthogonal transform circuit 52. In the DCT circuit 60, pixel-corresponding components of the digital video signal which form one field or one frame are grouped into a given number of blocks each having 8 by 8 adjacent pixels (8 pixels in the horizontal direction and 8 pixels in the vertical direction) according to the JPEG standards. The DCT circuit 60 subjects every block to two-dimensional DCT, generating 8 by 8 (64) pieces of DCT coefficient data per block. The 64 DCT coefficient data pieces in each block are scanned by the zigzag scanning circuit 62 in a zigzag order of FIG. 3, so that they are rearranged into a new sequence of the coefficient data pieces as D(0), D(1), D(2), ..., D(62), and D(63).

The zigzag scanning circuit 62 may include a memory with a capacity corresponding to more than one block, and a section for controlling data writing into and data readout from the memory.

The coefficient data pieces D(0), D(1), D(2), ..., D(62), and D(63) are sequentially outputted to the data separation switch 64 from the zigzag scanning circuit 62. The switch 64 is periodically changed by a switch control signal fed from a clock pulse generator in the system controller 76. The period of the switch control signal is equal to twice the period between the coefficient data pieces D(0), D(1), D(2), ..., D(62), and D(63). Accordingly, the switch 64 separates the coefficient data pieces D(0), D(1), D(2), ..., D(62), and D(63) into a sequence of the even-number coefficient data pieces D(0), D(2), ..., and D(62) and a sequence of the odd-number coefficient data pieces D(1), D(3), ..., and D(63). FIG. 4 shows the sequence of the even-number coefficient data pieces D(0), D(2), ..., and D(62). FIG. 5 shows the sequence of the odd-number coefficient data pieces D(1), D(3), ..., and D(63). The data separation switch 64 outputs the sequence of the even-number coefficient data pieces D(0), D(2), ..., and D(62) to the 0-data adding switch 66. The data separating switch 64 outputs the sequence of the odd-number coefficient data pieces D(1), D(3), ..., and D(63) to the 0-data adding switch 68.

The 0-data adding switch 66 is periodically changed by a switch control signal fed from a clock pulse generator in the system controller 76. The period and the timing of the switch control signal are designed so that the switch 66 adds a sequence of 32 0-data pieces to the end of the sequence of the even-number coefficient data pieces D(0), D(2), ..., and D(62). Accordingly, the switch 66 outputs a sequence of data pieces as shown in FIG. 4. The sequence of the even-number coefficient data pieces D(0), D(2), ..., and D(62) and the subsequent sequence of the 32 0-data pieces compose a sequence of 64 DCT coefficient data pieces which is handled as one block by a later stage. Thus, regarding a 1-block data sequence outputted from the switch 66, its former half which corresponds to low-frequency components has meaningful data pieces D(0), D(2), ..., and D(62) while its latter half which corresponds to high-frequency components has meaningless 0-data pieces.

The 0-data adding switch 68 is periodically changed by a switch control signal fed from a clock pulse generator in the system controller 76. The period and the timing of the switch control signal are designed so that the switch 68 adds a sequence of 32 0-data pieces to the end of the sequence of the odd-number coefficient data pieces D(1), D(3), ..., and D(63). Accordingly, the switch 68 outputs a sequence of data pieces as shown in FIG. 5. The sequence of the odd-number coefficient data pieces D(1), D(3), ..., and D(63) and the subsequent sequence of the 32 0-data pieces compose a sequence of 64 DCT coefficient data pieces which is handled as one block by a later stage. Thus, regarding a 1-block data sequence outputted from the switch 68, its former half which corresponds to low-frequency components has meaningful data pieces D(1), D(3), ..., and D(63) while its latter half which corresponds to high-frequency components has meaningless 0-data pieces.

The output data sequence from the 0-data adding switch 66 is fed to the variable-length encoding circuit 16A. In the variable-length encoding circuit 16A, each coefficient data piece of the output data sequence from the switch 66 is subjected by the quantizer 70A to quantization using a plurality of discrete levels (quantization levels) separated by a variable quantization step size. The code amount control circuit 72A in the variable-length encoding circuit 16A estimates the amount (the number of bits) of the output data of the quantizer 70A per unit time from the output data of the switch 66. The code amount control circuit 72A adjusts the quantization step size in response to the estimated data amount to control the actual amount of the output data of the quantizer 70A per unit time. In the variable-length encoding circuit 16A, the two-dimensional Huffman encoding circuit 74A subjects a sequence of the output data of the quantizer 70A to given variable-length encoding. Specifically, the two-dimensional Huffman encoding circuit 74A encodes the sequence of the output data of the quantizer 70A into corresponding words of a given two-dimensional Huffman code. The words of the Huffman code are previously assigned to different combinations of zero-run lengths and subsequent non-zero data respectively.

It is now assumed that the sequence of the output data from the quantizer 70A takes the form "00501000004000002006" as shown in FIG. 6. In this case, the two-dimensional Huffman encoding circuit 74A encodes the data sequence as follows. The first part "005" of the data sequence is encoded into a word C(2, 5) since the zero-run length is "2" and the subsequent non-zero data is "5". The second part "01" following the "005" is encoded into a word C(1, 1) since the zero-run length is "1" and the subsequent non-zero data is "1". The third part "000004" following the "01" is encoded into a word C(5, 4) since the zero-run length is "5" and the subsequent non-zero data is "4". The fourth part "00002" following the "000004" is encoded into a word C(4, 2) since the zero-run length is "4" and the subsequent non-zero data is "2". The fifth part "006" following the "00002" is encoded into a word C(2, 6) since the zero-run length is "2" and the subsequent non-zero data is "6".

The output data sequence from the O-data adding switch 68 is fed to the variable-length encoding circuit 16B. In the variable-length encoding circuit 16B, each coefficient data piece of the output data sequence from the switch 68 is subjected by the quantizer 70B to quantization using a plurality of discrete levels (quantization levels) separated by a variable quantization step size. The code amount control circuit 72B in the variable-length encoding circuit 16B estimates the amount (the number of bits) of the output data of the quantizer 70B per unit time from the output data of the switch 68. The code amount control circuit 72B adjusts the quantization step size in response to the estimated data amount to control the actual amount of the output data of the quantizer 70B per unit time. In the variable-length encoding circuit 16B, the two-dimensional Huffman encoding circuit 74B subjects a sequence of the output data of the quantizer 70B to given variable-length encoding. Specifically, the two-dimensional Huffman encoding circuit 74B encodes the sequence of the output data of the quantizer 70B into corresponding words of a given two-dimensional Huffman code. The words of the Huffman code are previously assigned to different combinations of zero-run lengths and subsequent non-zero data respectively. The variable-length encoding circuit 16B is similar in design to the variable-length encoding circuit 16A.

The error correction encoding circuit 18A receives the output data from the two-dimensional Huffman encoding circuit 74A in the variable-length encoding circuit 16A. The error correction encoding circuit 18A subjects the output data of the variable-length encoding circuit 16A to given encoding such as Reed-Solomon encoding for error correction. The error correction encoding circuit 18A is followed by the record encoding circuit 20A. The record encoding circuit 20A subjects the output data of the error correction encoding circuit 18A to given encoding such as I-NRZI encoding for recording. The output data from the record encoding circuit 20A is fed to the recording head 24A via the amplifier 22A before being recorded into a magnetic tape 26 by the recording head 24A.

The error correction encoding circuit 18B receives the output data from the two-dimensional Huffman encoding circuit 74B in the variable-length encoding circuit 16B. The error correction encoding circuit 18B subjects the output data of the variable-length encoding circuit 16B to given encoding such as Reed-Solomon encoding for error correction. The error correction encoding circuit 18B is followed by the record encoding circuit 20B. The record encoding circuit 20B subjects the output data of the error correction encoding circuit 18B to given encoding such as I-NRZI encoding for recording. The output data from the record encoding circuit 20B is fed to the recording head 24B via the amplifier 22B before being recorded into the magnetic tape 26 by the recording head 24B.

The variable-length encoding circuit 16A, the error correction encoding circuit 18A, the record encoding circuit 20A, and the amplifier 22A can be formed by IC's for home-use digital VTR's. Also, the variable-length encoding circuit 16B, the error correction encoding circuit 18B, the record encoding circuit 20B, and the amplifier 22B can be formed by IC's for home-use digital VTR's.

The output data from the orthogonal transform circuit 52 is separated by the separation circuit 54 into two which are compressed by the variable-length encoding circuits 16A and 16B respectively. Certain amounts of information represented by the output data from the orthogonal transform circuit 52 disappear as a result of the data compressions by the variable-length encoding circuits 16A and 16B. Since the output data from the orthogonal transform circuit 52 is processed by the variable-length encoding circuits 16A and 16B in a parallel manner, the total amount of information deleted by the data compressions is smaller than the amount of information which disappears in a conventional design in which the output data from an orthogonal transform circuit is processed by a single variable-length encoding circuit. The smaller amount of the deleted information enables a higher quality of an image represented by the output data from the variable-length encoding circuits 16A and 16B.

In cases where each of the variable-length encoding circuits 16A and 16B uses an IC for a home-use digital VTR which is designed to provide data compression corresponding to a decrease in a video data rate from about 160 Mbps to about 25 Mbps, the resultant of the data compressions by the variable-length encoding circuits 16A and 16B corresponds to a decrease in a video data rate from about 160 Mbps to about 50 Mbps.

The reproducing head 28A operates to reproduce data from the magnetic tape 26 which has been recorded by the recording head 24A. The reproduced data is fed from the reproducing head 28A to the data detection circuit 32A via the amplifier 30A. The data detection circuit 32A subjects the reproduced data to processing inverse with respect to the encoding by the record encoding circuit 20A. Specifically, the data detection circuit 32A removes sync signal components and control signal components from the reproduced data. The error correction circuit 34A receives the output data from the data detection circuit 32A, and subjects the received data to processing inverse with respect to the encoding by the error correction encoding circuit 18A. Specifically, the error correction circuit 34A detects errors in the received data and corrects the errors. The variable-length decoding circuit 36A receives the output data from the error correction circuit 34A, and subjects the received data to decoding inverse with respect to the encoding by the variable-length encoding circuit 18A. Specifically, the variable-length decoding circuit 36A decodes the received data into a sequence of data pieces D(0), D(2), . . . , and D(62) and subsequent 32 O-data pieces per block.

The reproducing head 28B operates to reproduce data from the magnetic tape 26 which has been recorded by the recording head 24B. The reproduced data is fed from the reproducing head 28B to the data detection circuit 32B via the amplifier 30B. The data detection circuit 32B subjects the reproduced data to processing inverse with respect to the encoding by the record encoding circuit 20B. Specifically, the data detection circuit 32B removes sync signal components and control signal components from the reproduced data. The error correction circuit 34B receives the output data from the data detection circuit 32B, and subjects the received data to processing inverse with respect to the encoding by the error correction encoding circuit 18B. Specifically, the error correction circuit 34B detects errors in the received data and corrects the errors. The variable-length decoding circuit 36B receives the output data from the error correction circuit 34B, and subjects the received data to decoding inverse with respect to the encoding by the variable-length encoding circuit 18B. Specifically, the variable-length decoding circuit 36B decodes the received data into a sequence of data pieces D(1), D(3), . . . , and D(63) and subsequent 32 O-data pieces per block.

The mixing circuit 56 receives the sequence of the data pieces D(0), D(2), . . . , and D(62) and the subsequent 32 O-data pieces from the variable-length decoding circuit 36A every block. Also, the mixing circuit 56 receives the sequence of the data pieces D(1), D(3), . . . , and D(63) and the subsequent 32 O-data pieces from the variable-length decoding circuit 36B every block. The mixing circuit 56 removes the O-data pieces in the latter halves from the received data sequences, and combines the sequence of the data pieces D(0), D(2), . . . , and D(62) and the sequence of the data pieces D(1), D(3), . . . , and D(63) into a sequence of the data pieces D(0), D(1), D(2), D(3), . . . , D(62), and D(63). The mixing circuit 56 includes a switch for periodically and alternately selecting one of the two received data. The inverse orthogonal transform circuit 38 receives the sequence of the data pieces D(0), D(1), . . . , and D(63) from the mixing circuit 56 every block, and subjects the received data sequence to given transform inverse with respect to the orthogonal transform by the orthogonal transform circuit 52. During the inverse transform, the inverse orthogonal transform circuit 38 converts the received data into a corresponding digital video signal. The frame memory 41 receives the digital video signal from the inverse orthogonal transform circuit 38, and stores the received digital video signal. The D/A converter 40 reads out the digital video signal from the frame memory 41, and converts the digital video signal into a corresponding analog video signal. The analog video signal outputted from the D/A converter 40 corresponds to the original analog video signal fed to the A/D converter 10.

While one block is composed of 8 by 8 adjacent pixels in this embodiment, one block may be composed of a given number of adjacent pixels which differs from 8 by 8.

While the orthogonal transform circuit 52 executes two-dimensional DCT on the digital video signal in this embodiment, the orthogonal transform circuit 52 may execute other orthogonal transform.

The variable-length encoding by the encoding circuits 16A and 16B may be changed to another type of variable-length encoding.

Figure 3:
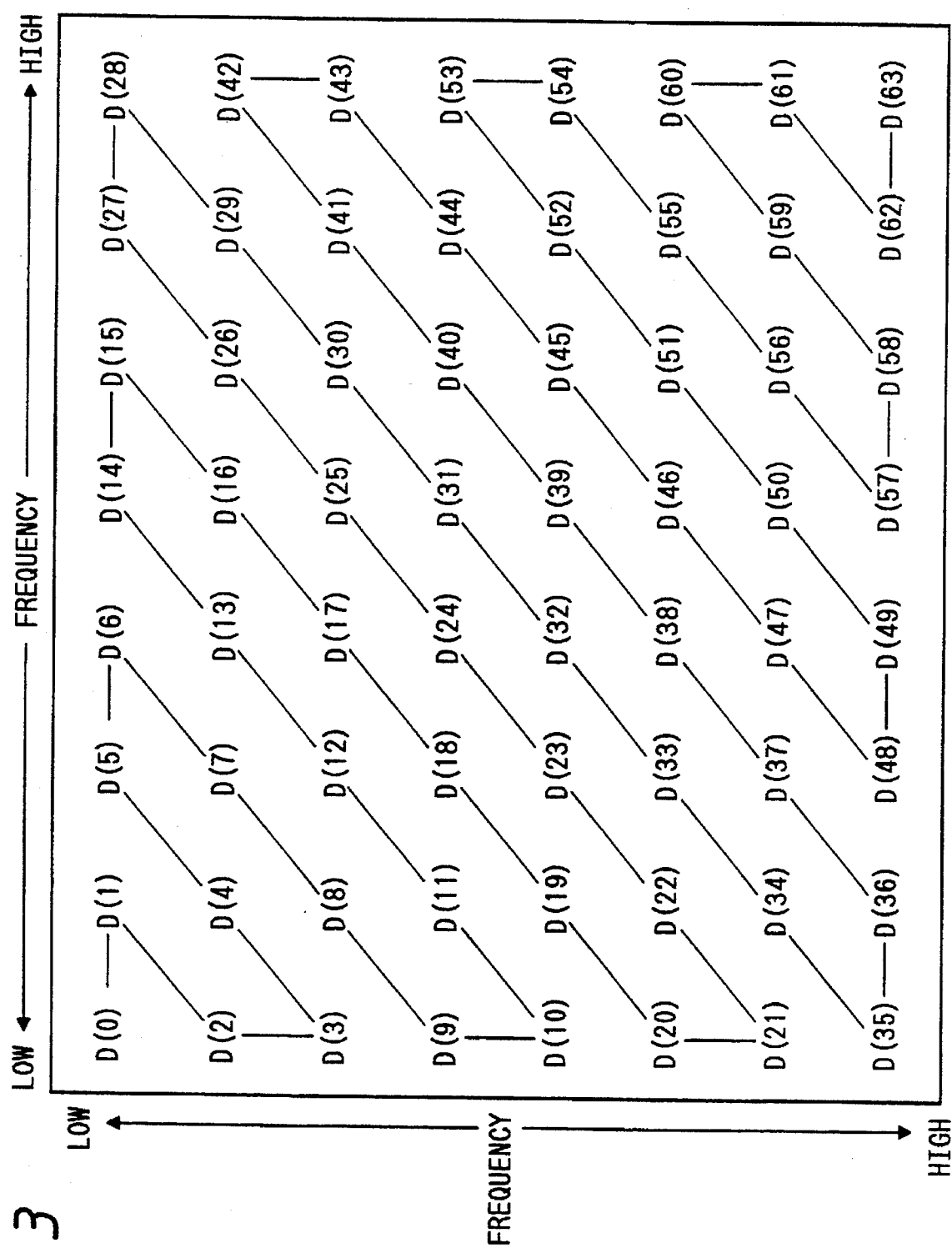
FIG. 3 is a diagram of a scanning format in the digital VTR of FIGS. 1 and 1A.

The zigzag scanning of FIG. 3 may be replaced by another type of scanning.

While the separation circuit 54 divides the output data from the orthogonal transform circuit 52 into two, the separation circuit 54 may divide the data into three or more processed by an increased number of variable-length encoding circuits respectively.

A switch may be additionally provided which selectively couples the output side of the orthogonal transform circuit 52 with the input side of the variable-length encoding circuit 16A or the input side of the separation circuit 54. In this case, when the switch couples the output side of the orthogonal transform circuit 52 with the input side of the variable-length encoding circuit 16A, the digital VTR operates in a standard image-quality mode. On the other hand, the switch couples the output side of the orthogonal transform circuit 52 with the input side of the separation circuit 54, the digital VTR operates in a high image-quality mode.

The O-data adding function may be omitted from the separation circuit 54.

The output data from the record encoding circuit 20A and the output data from the record encoding circuit 20B may be combined in time-division multiplexing or frequency-division multiplexing before being recorded into the magnetic tap 26 via a single recording head. In this case, the reproducing section is designed to handle the multiplexed data.

While the embodiment of this invention relates to the digital VTR, this invention may be applied to another digital video recording and reproducing apparatus such as a video disk recorder.

It is preferable that data composing one frame is recorded on two tracks. Data composing one frame may be recorded on more than two tracks (for example, eight tracks or ten tracks).

DESCRIPTION OF THE SECOND PREFERRED EMBODIMENT

Figures 7, 7A:
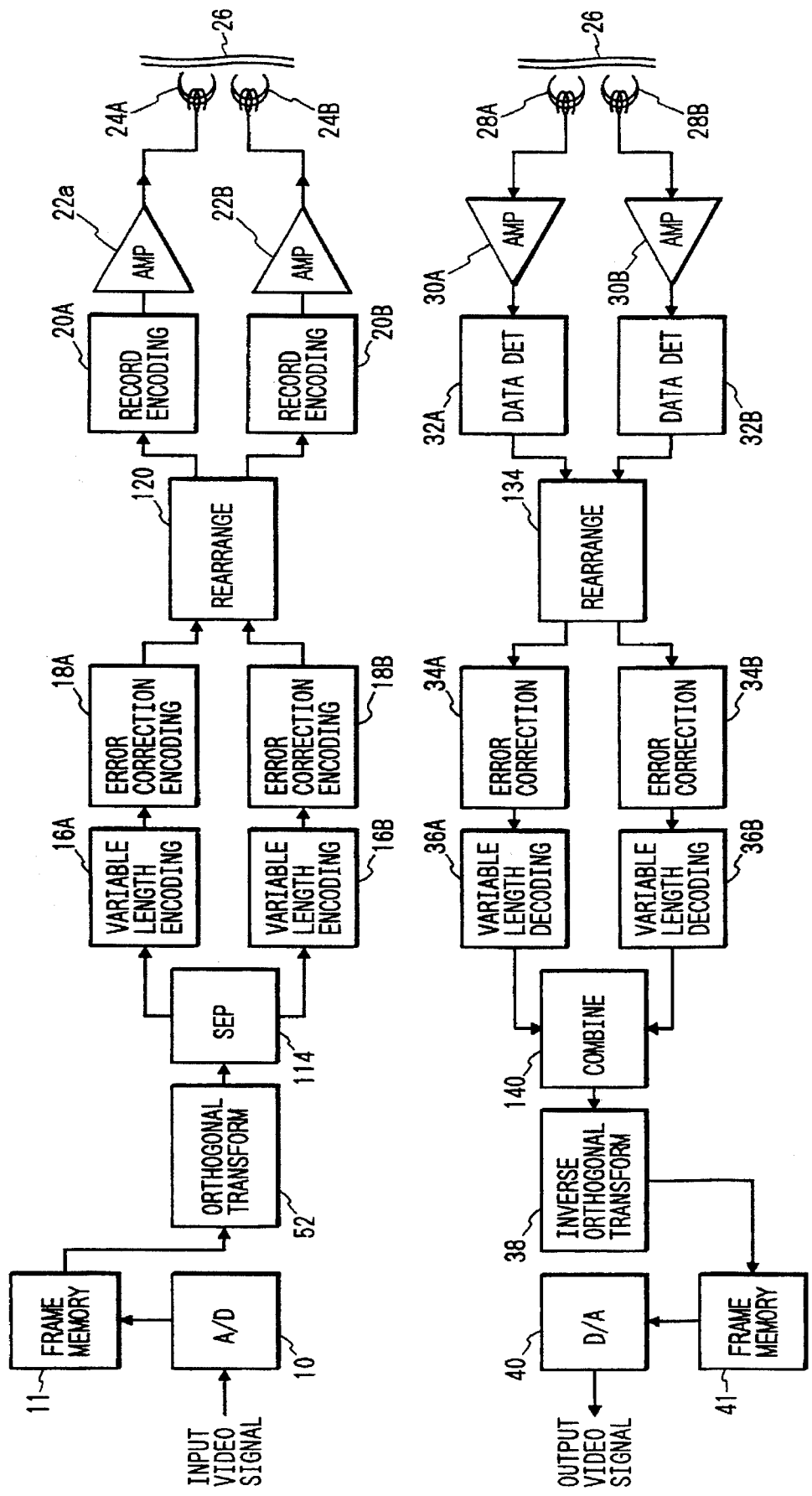
FIGS. 7 and 7A are a block diagram of a digital VTR according to a second embodiment of this invention.

FIG. 7 shows a digital VTR according to a second embodiment of this invention which is similar to the embodiment of FIGS. 1–6 except for design changes indicated later.

Figure 8:
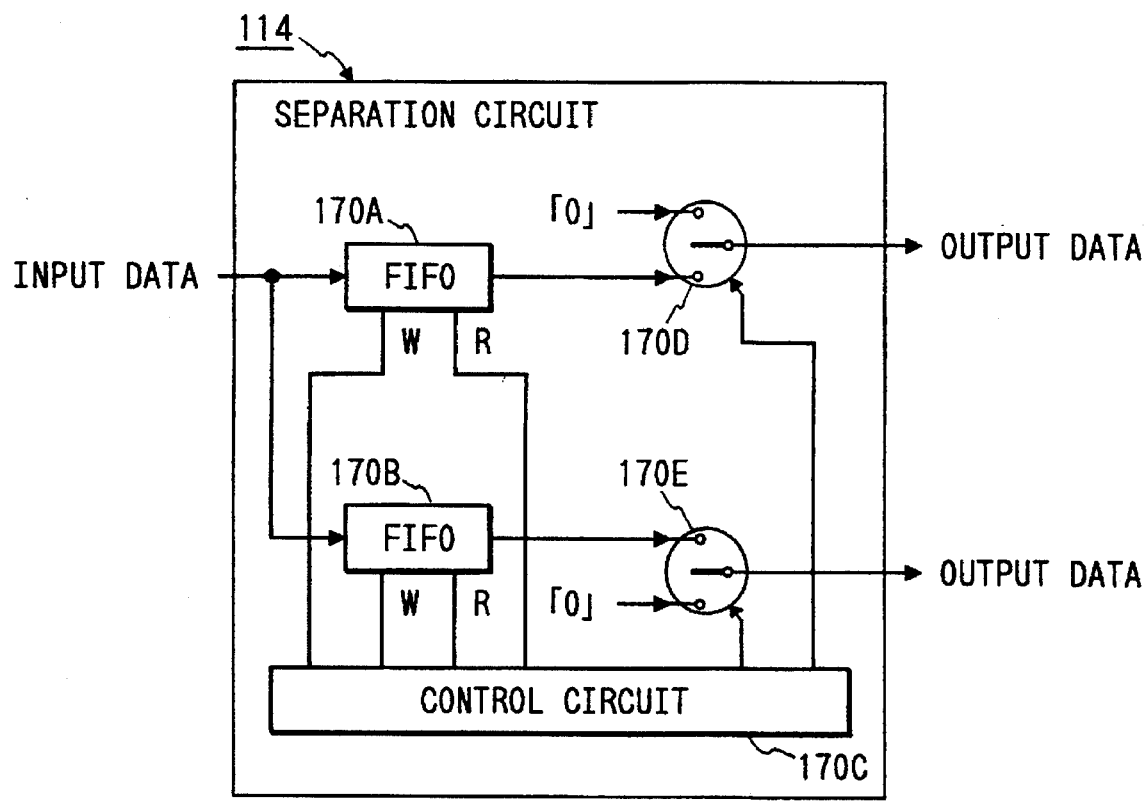
FIG. 8 is a block diagram of a separation circuit in FIGS. 7 and 7A.

The embodiment of FIG. 7 uses a separation circuit 114 in place of the separation circuit 54 of FIGS. 1 and 2. As shown in FIG. 8, the separation circuit 114 includes FIFO memories 170A and 170B, a control circuit 170C, and O-data adding switches 170D and 170E. The input sides of the FIFO memories 170A and 170B are connected to the output side of an orthogonal transform circuit 52 (see FIG. 7). The FIFO memories 170A and 170B are connected to the control circuit 170C. Data writing into and data readout from the FIFO memories 170A and 170B are controlled by the control circuit 170C. The output sides of the FIFO memories 170A and 170B are connected to first input sides of the O-data adding switches 170D and 170E respectively. Second input sides of the switches 170D and 170E receive data in a logic state "0" from a data source (not shown). The switch 170D has a common output side. The output side of the switch 170D is selectively connected to the first input side or the second input side thereof in response to a switch control signal fed from the control circuit 170C. The output side of the switch 170D is followed by a variable-length encoding circuit 16A (see FIG. 7). Similarly, the switch 170E has a common output side. The output side of the switch 170E is selectively connected to the first input side or the second input side thereof in response to a switch control signal fed from the control circuit 170C. The output side of the switch 170E is followed by a variable-length encoding circuit 16B (see FIG. 7).

The separation circuit 114 operates as follows. The FIFO memories 170A and 170B are periodically controlled by data writing signals from the control circuit 170C so that DCT coefficient data pieces D(0), D(1), D(2), . . . , D(62), and D(63) outputted from the orthogonal transform circuit 52 which compose one block are periodically and alternately written into the FIFO memories 170A and 170B. Specifically, the even-number coefficient data pieces D(0), D(2), ..., and D(62) are sequentially written into the FIFO memory 170A while the odd-number coefficient data pieces D(1), D(3), ..., and D(63) are sequentially written into the FIFO memory 170B. The FIFO memory 170A is periodically controlled by a data reading signal from the control circuit 170C so that the even-number coefficient data pieces D(0), D(2), ..., and D(62) are sequentially read out therefrom and are applied to the O-data adding switch 170D. Similarly, the FIFO memory 170B is periodically controlled by a data reading signal from the control circuit 170C so that the odd-number coefficient data pieces D(1), D(3), ..., and D(63) are sequentially read out therefrom and are applied to the O-data adding switch 170E.

The O-data adding switch 170D is periodically changed by a switch control signal fed from the control circuit 170C. The period and the timing of the switch control signal are designed so that the switch 170D adds a sequence of 32 O-data pieces to the end of the sequence of the even-number coefficient data pieces D(0), D(2), ..., and D(62). Accordingly, the switch 170D outputs a sequence of data pieces as shown in FIG. 4. The sequence of the even-number coefficient data pieces D(0), D(2), ..., and D(62) and the subsequent sequence of the 32 O-data pieces compose a sequence of 64 DCT coefficient data pieces which is handled as one block by a later stage. Thus, regarding a 1-block data sequence outputted from the switch 170D, its former half which corresponds to low-frequency components has meaningful data pieces D(0), D(2), ..., and D(62) while its later half which corresponds to high-frequency components has meaningless O-data pieces. The output data sequence from the switch 170D is fed to the variable-length encoding circuit 16A (see FIG. 7).

The O-data adding switch 170E is periodically changed by a switch control signal fed from the control circuit 170C. The period and the timing of the switch control signal are designed so that the switch 170E adds a sequence of 32 O-data pieces to the end of the sequence of the odd-number coefficient data pieces D(1), D(3), ..., and D(63). Accordingly, the switch 170E outputs a sequence of data pieces as shown in FIG. 5. The sequence of the odd-number coefficient data pieces D(1), D(3), ..., and D(63) and the subsequent sequence of the 32 O-data pieces compose a sequence of 64 DCT coefficient data pieces which is handled as one block by a later stage. Thus, regarding a 1-block data sequence outputted from the switch 170E, its former half which corresponds to low-frequency components has meaningful data pieces D(1), D(3), ..., and D(63) while its latter half which corresponds to high-frequency components has meaningless O-data pieces. The output data sequence from the switch 170E is fed to the variable-length encoding circuit 16B (see FIG. 7).

The embodiment of FIG. 7 includes a data rearranging circuit 120 connected among error correction encoding circuits 18A and 18B and record encoding circuits 20A and 22B. The rearranging circuit 120 receives an output data sequence from the error encoding circuit 18A which relates to even-number coefficient data pieces D(0), D(2), ..., and D(62). Also, the rearranging circuit 120 receives an output data sequence from the error encoding circuit 18B which relates to odd-number coefficient data pieces D(1), D(3), ..., and D(63). The rearranging circuit 120 rearranges data pieces in the received data sequences and thereby makes the received data sequences into two new data sequences which are outputted to the record encoding circuits 20A and 20B respectively. The rearranging circuit 120 includes, for example, a frame memory or a field memory, and a controller for data writing into and data readout from the memory.

The embodiment of FIG. 7 includes a data rearranging circuit 134 connected among data detection circuits 32A and 32B and error correction circuits 34A and 34B. The rearranging circuit 134 receives an output data sequence from the data detection circuit 32A. Also, the rearranging circuit 134 receives an output data sequence from the data detection circuit 32B. The rearranging circuit 134 rearranges data pieces in the received data sequences and thereby makes the received data sequences into first and second new data sequences which are outputted to the error correction circuits 34A and 34B respectively. The first new data sequence outputted to the error correction circuit 34A corresponds to the data sequence outputted from the error correction encoding circuit 18A, and relates to even-number coefficient data pieces D(0), D(2), ..., and D(62). The second new data sequence outputted to the error correction circuit 34B corresponds to the data sequence outputted from the error correction encoding circuit 18B, and relates to odd-number coefficient data pieces D(1), D(3), ..., and D(63). The function of the rearranging circuit 134 is inverse with respect to the function of the rearranging circuit 120. The rearranging circuit 134 includes, for example, a frame memory or a field memory, and a controller for data writing into and data readout from the memory.

Figure 9:
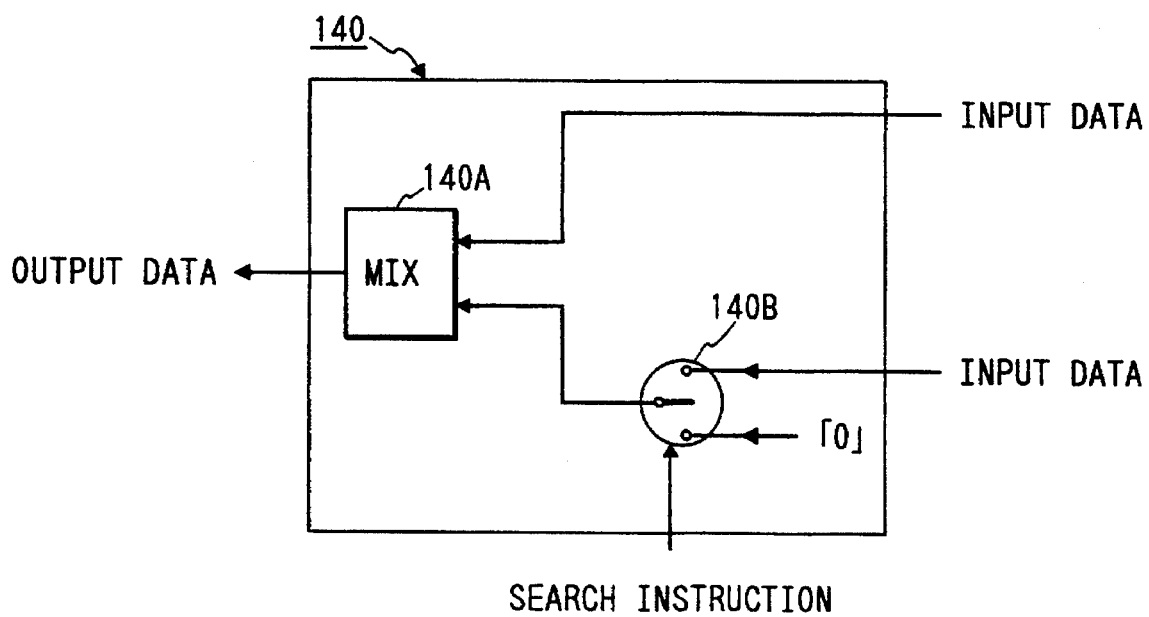
FIG. 9 is a block diagram of a combining circuit in FIG. 7 and 7A.

The embodiment of FIG. 7 uses a combining circuit 140 in place of the mixing circuit 56 of FIG. 1. As shown in FIG. 9, the combining circuit 140 includes a mixing circuit 140A and a O-data adding switch 140B. A first input terminal of the mixing circuit 140A is connected to the output side of a variable-length decoding circuit 36A (see FIG. 7). The switch 140B has first and second input sides and a common output side. The output side of the switch 140B is selectively connected to the first input side or the second input side thereof in response to a search instruction signal fed from a combination of a signal source and a switching device (not shown). The first input side of the switch 140B is connected to the output side of a variable-length decoding circuit 36B (see FIG. 7). The second input side of the switch 140B receives data in a logic state "0" from a data source (not shown). The output side of the switch 140B is connected to a second input terminal of the mixing circuit 140A. The output terminal of the mixing circuit 140A is connected to the input side of an inverse orthogonal transform circuit 38.

Figure 10:
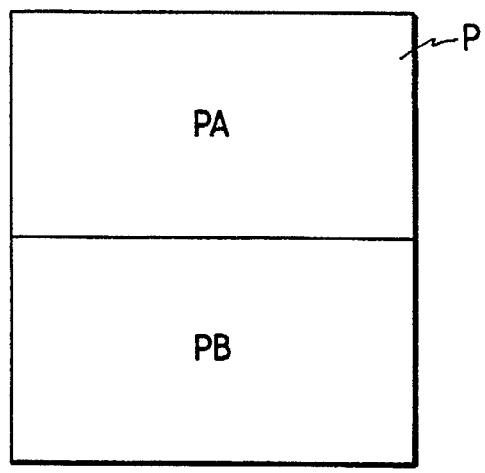
FIG. 10 is a diagram of a frame divided into upper and lower halves in the digital VTR of FIGS. 7 and 7A.
Figure 11:
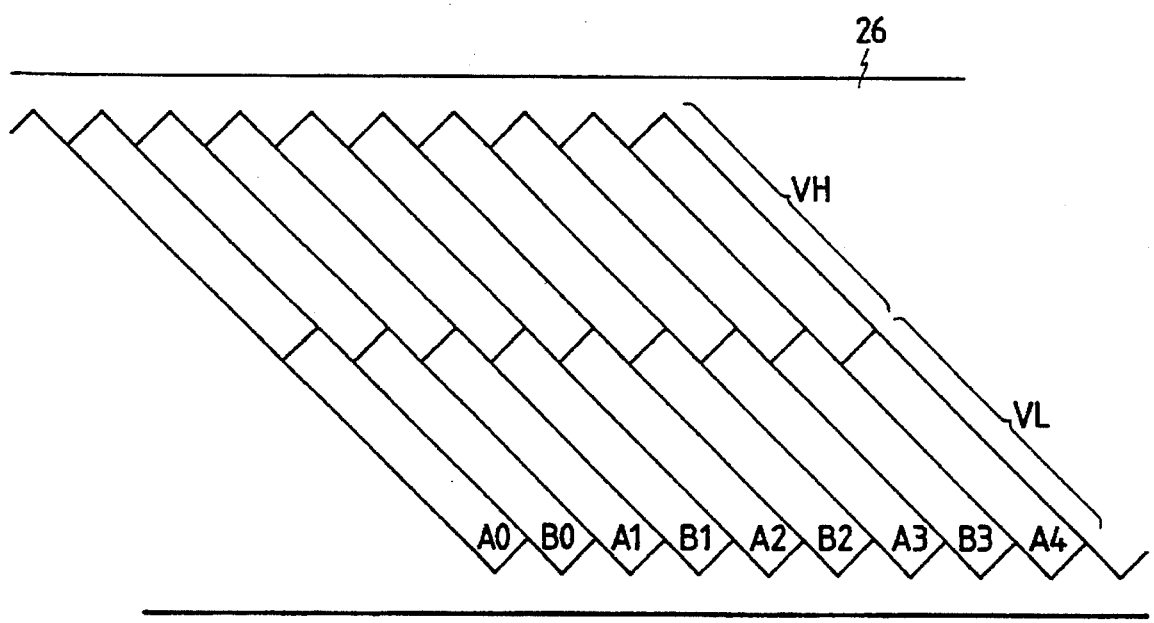
FIG. 11 is a diagram of tracks on a magnetic tape in the digital VTR of FIGS. 7 and 7A.

As shown in FIG. 10, a 1-frame image P is divided into an upper half PA and a lower half PB. The data rearranging circuit 120 is designed so that information representing the upper half image PA and information representing the lower half image PB will be fed to recording heads 24A and 24B respectively and will be recorded on different tracks in a magnetic tape 26 respectively. As shown in FIG. 11, each of tracks on the magnetic tape 26 is divided into an upper half VH and a lower half VL. The data rearranging circuit 120 is designed so that information relating to sequences of even-number coefficient data pieces D(0), D(2), ..., and D(62) will be recorded on a track lower half VL while information relating to sequences of odd-number coefficient data pieces D(1), D(3), ..., and D(63) will be recorded on a track upper half VH.

The recording heads 24A and 24B are adjacent to each other. Therefore, two adjacent tracks on the magnetic tape 26 store all data composing one frame. It is preferable that the recording heads 24A and 24B have azimuths opposite to each other.

As previously described, the rearranging circuit 120 rearranges data pieces in the output data sequences from the error correction encoding circuits 18A and 18B and thereby makes the data sequences into two new data sequences which are outputted to the record encoding circuits 20A and 20B respectively. Specifically, as a first new data sequence fed to the record encoding circuit 20A, the rearranging circuit 120 sequentially outputs first information and second information every frame. The first information relates to sequences of even-number coefficient data pieces $D(0)$, $D(2)$, ..., and $D(62)$ which represent an upper half image PA of a frame. The second information relates to sequences of odd-number coefficient data pieces $D(1)$, $D(3)$, ..., and $D(63)$ which represent the upper half image PA of the frame. As a second new data sequence fed to the record encoding circuit 20A, the rearranging circuit 120 sequentially outputs third information and fourth information every frame. The third information relates to sequences of even-number coefficient data pieces $D(0)$, $D(2)$, ..., and $D(62)$ which represent a lower half image PB of the frame. The fourth information relates to sequences of odd-number coefficient data pieces $D(1)$, $D(3)$, ..., and $D(63)$ which represent the lower half image PB of the frame.

The above-indicated first information and second information outputted from the rearranging circuit 120 are transmitted to the recording head 24A via the record encoding circuit 20A and an amplifier 22A, being recorded via the recording head 24A on the magnetic tape 26. In addition, the above-indicated third information and fourth information outputted from the rearranging circuit 120 are transmitted to the recording head 24B via the record encoding circuit 20B and an amplifier 22B, being recorded via the recording head 24B on the magnetic tape 26. Thus, information relating to sequences of even-number coefficient data pieces $D(0)$, $D(2)$, ..., and $D(62)$ which represent an upper half image PA of a flame is recorded on the lower half VL of a track A0 via the recording head 24A. Information relating to sequences of odd-number coefficient data pieces $D(1)$, $D(3)$, ..., and $D(63)$ which represent the upper half image PA of the frame is recorded on the upper half VH of the track A0 via the recording head 24A. In addition, information relating to sequences of even-number coefficient data pieces $D(0)$, $D(2)$, ..., and $D(62)$ which represent a lower half image PB of the frame is recorded on the lower half VL of a track B0 via the recording head 24B. Information relating to sequences of odd-number coefficient data pieces $D(1)$, $D(3)$, ..., and $D(63)$ which represent the lower half image PB of the frame is recorded on the upper half VH of the track B0 via the recording head 24B.

Similarly, image information of a next frame and image information of later flames are sequentially recorded on subsequent tracks A1, B1, A2, B2, ....

A head assembly including the recording heads 24A and 24B and reproducing heads 28A and 28B, and a tape drive mechanism are designed so that the head assembly can scan the magnetic tape 26 in a given helical scanning format (see FIG. 11).

A normal playback mode of operation of the digital VTR will be described hereinafter. During the normal playback mode of operation, the reproducing head 28A operates to reproduce data from the magnetic tape 26 which has been recorded by the recording head 24A. Accordingly, the reproduced data contains a sequence of first information and second information every frame. The first information relates to sequences of even-number coefficient data pieces $D(0)$, $D(2)$, ..., and $D(62)$ which represent an upper half image PA of a frame. The second information relates to sequences of odd-number coefficient data pieces $D(1)$, $D(3)$, ..., and $D(63)$ which represent the upper half image PA of the frame. The reproduced data is fed from the reproducing head 28A to the data detection circuit 32A via the amplifier 30A. The data detection circuit 32A subjects the reproduced data to processing inverse with respect to the encoding by the record encoding circuit 20A. Specifically, the data detection circuit 32A removes sync signal components and control signal components from the reproduced data.

During the normal playback mode of operation, the reproducing head 28B operates to reproduce data from the magnetic tape 26 which has been recorded by the recording head 24B. Accordingly, the reproduced data contains a sequence of third information and fourth information every frame. The third information relates to sequences of even-number coefficient data pieces $D(0)$, $D(2)$, ..., and $D(62)$ which represent a lower half image PB of the frame. The fourth information relates to sequences of odd-number coefficient data pieces $D(1)$, $D(3)$, ..., and $D(63)$ which represent the lower half image PB of the frame. The reproduced data is fed from the reproducing head 28B to the data detection circuit 32B via the amplifier 30B. The data detection circuit 32B subjects the reproduced data to processing inverse with respect to the encoding by the record encoding circuit 20B. Specifically, the data detection circuit 32B removes sync signal components and control signal components from the reproduced data.

During the normal playback mode of operation, the rearranging circuit 134 receives the output data sequence from the data detection circuit 32A which represents an upper half image PA of every frame. Also, the rearranging circuit 134 receives the output data sequence from the data detection circuit 32B which represents a lower half image PB of every frame. The rearranging circuit 134 rearranges data pieces in the received data sequences and thereby makes the received data sequences into first and second new data sequences which are outputted to the error correction circuits 34A and 34B respectively. The first new data sequence outputted to the error correction circuit 34A corresponds to the data sequence outputted from the error correction encoding circuit 18A, and relates to even-number coefficient data pieces $D(0)$, $D(2)$, ..., and $D(62)$. The second new data sequence outputted to the error correction circuit 34B corresponds to the data sequence outputted from the error correction encoding circuit 18B, and relates to odd-number coefficient data pieces $D(1)$, $D(3)$, ..., and $D(63)$.

During the normal playback mode of operation, the error correction circuit 34A receives the first output data from the rearranging circuit 134, and subjects the received data to processing inverse with respect to the encoding by the error correction encoding circuit 18A. Specifically, the error correction circuit 34A detects errors in the received data and corrects the errors. The variable-length decoding circuit 36A receives the output data from the error correction circuit 34A, and subjects the received data to decoding inverse with respect to the encoding by the variable-length encoding circuit 16A. Specifically, the variable-length decoding circuit 36A decodes the received data into a sequence of data pieces $D(0)$, $D(2)$, ..., and $D(62)$ and subsequent 32 O-data pieces per block. On the other hand, the error correction circuit 34B receives the second output data from the rearranging circuit 134, and subjects the received data to processing inverse with respect to the encoding by the error correction encoding circuit 18B. Specifically, the error correction circuit 34B detects errors in the received data and corrects the errors. The variable-length decoding circuit 36B receives the output data from the error correction circuit 34B, and subjects the received data to decoding inverse with respect to the encoding by the variable-length encoding circuit 16B. Specifically, the variable-length decoding circuit 36B decodes the received data into a sequence of data pieces D(1), D(3), ..., and D(63) and subsequent 32 O-data pieces per block.

During the normal playback mode of operation, the output side of the O-data adding switch 140B in the combining circuit 140 remains connected to the first input side thereof in response to the search instruction signal which indicates the absence of a search requirement. Accordingly, the mixing circuit 140A in the combining circuit 140 receives the sequence of the data pieces D(1), D(3), ..., and D(63) and the subsequent 32 O-data pieces from the variable-length decoding circuit 36B via the switch 140B every block. In addition, the mixing circuit 140A receives the sequence of the data pieces D(0), D(2), ..., and D(62) and the subsequent 32 O-data pieces from the variable-length decoding circuit 36A every block. The mixing circuit 140A removes the O-data pieces in the latter halves from the received data sequences, and combines the sequence of the data pieces D(0), D(2), ..., and D(62) and the sequence of the data pieces D(1), D(3), ..., and D(63) into a sequence of the data pieces D(0), D(1), D(2), D(3), ..., D(62), and D(63). The mixing circuit 140A includes a switch for periodically and alternately selecting one of the two received data. The inverse orthogonal transform circuit 38 receives the sequence of the data pieces D(0), D(1), ..., and D(63) from the mixing circuit 140A every block, and subjects the received data sequence to given transform inverse with respect to the orthogonal transform by the orthogonal transform circuit 52. During the inverse transform, the inverse orthogonal transform circuit 38 converts the received data into a corresponding digital video signal. The frame memory 41 receives the digital video signal from the inverse orthogonal transform circuit 38, and stores the received digital video signal. The D/A converter 40 reads out the digital video signal from the frame memory 41, and converts the digital video signal into a corresponding analog video signal. The analog video signal outputted from the D/A converter 40 corresponds to the original analog video signal fed to the A/D converter 10.

Figure 12:
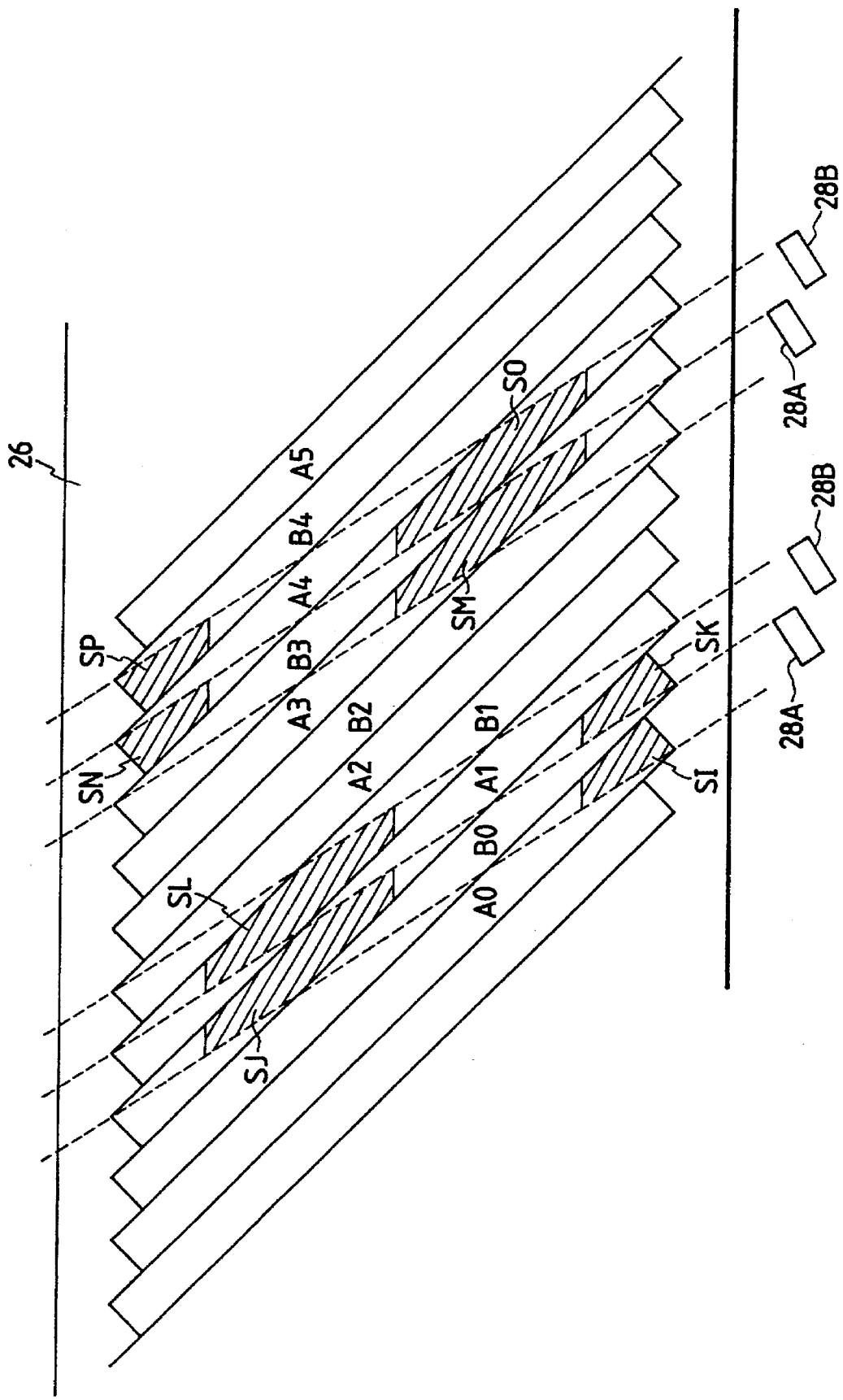
FIG. 12 is a diagram of tracks on a magnetic tape and reproducing heads in the digital VTR of FIGS. 7 and 7A.

Hereinafter, a description will be given of a search mode of operation of the digital VTR which has a speed (a tape speed or a relative speed between the head assembly and the magnetic tape 26) higher than the speed in the normal playback mode of operation by a factor of 2.5. With reference to FIG. 12, during an example of the search mode of operation, the reproducing head 28A reproduces data from a region SI in a track A0, a region SJ in a track A1, a region SM in a track A3, and a region SN in a track A4 on the magnetic tape 26. On the other hand, the reproducing head 28B reproduces data from a region SK in a track B0, a region SL in a track B1, a region SO in a track B3, and a region SP in a track B4 on the magnetic tape 26.

Figure 13:
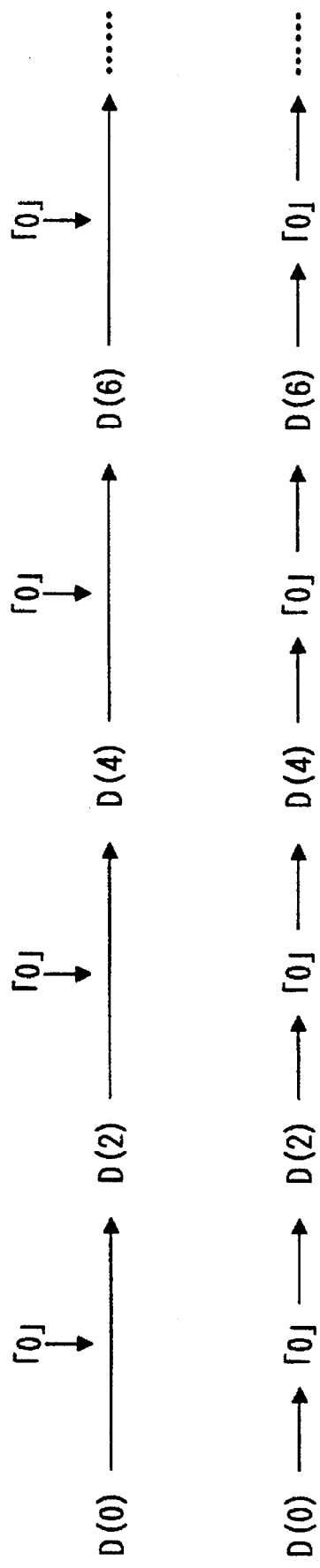

During the search mode of operation, the output side of the O-data adding switch 140B in the combining circuit 140 remains connected to the second input side thereof in response to the search instruction signal which indicates the presence of a search requirement. Accordingly, the mixing circuit 140A in the combining circuit 140 receives a sequence of 64 O-data pieces via the switch 140B every block. In addition, the mixing circuit 140A receives the sequence of the data pieces D(0), D(2), ..., and D(62) and the subsequent 32 O-data pieces from the variable-length decoding circuit 36A every block. The mixing circuit 140A removes the O-data pieces in the latter halves from the received data sequences, and alternately combines the sequence of the data pieces D(0), D(2), ..., and D(62) and the sequence of the 32 O-data pieces into a sequence of the data pieces D(0), "0", D(2), "0", D(4), "0", D(6), ..., "0", D(62), and "0" as shown in FIG. 13. The inverse orthogonal transform circuit 38 receives the sequence of the data pieces D(0), "0", D(2), "0", D(4), "0", D(6), ..., "0", D(62), and "0" from the mixing circuit 140A every block, and subjects the received data sequence to the given transform inverse with respect to the orthogonal transform by the orthogonal transform circuit 52. During the inverse transform, the inverse orthogonal transform circuit 38 converts the received data into a corresponding digital video signal. The frame memory 41 receives the digital video signal from the inverse orthogonal transform circuit 38, and stores the received digital video signal. The D/A converter 40 reads out the digital video signal from the frame memory 41, and converts the digital video signal into a corresponding analog video signal.

During the search mode of operation, since the analog video signal outputted from the D/A converter 40 contains information represented by lowest order DCT data or dc component data D(0), the quality of an image represented by the analog video signal is maintained at such a level that the contents of the image can be confirmed.

Figure 14:
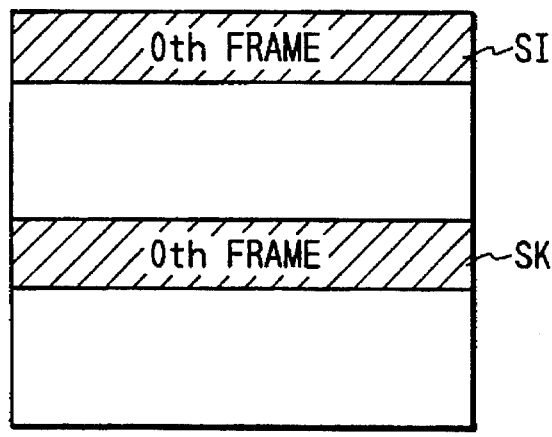
FIG. 14 is a diagram of a first component reproduced image in connection with the digital VTR of FIGS. 7 and 7A.
Figure 15:
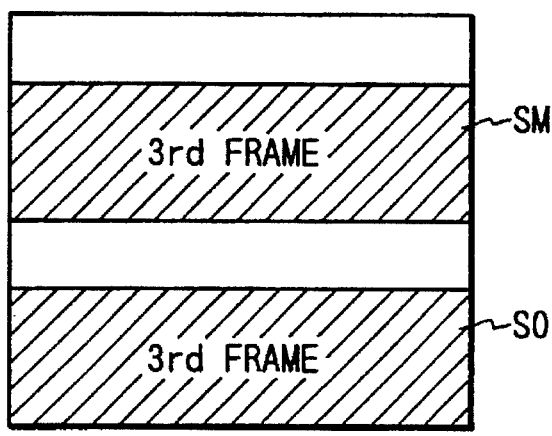
FIG. 15 is a diagram of a second component reproduced image in connection with the digital VTR of FIGS. 7 and 7A.
Figure 16:
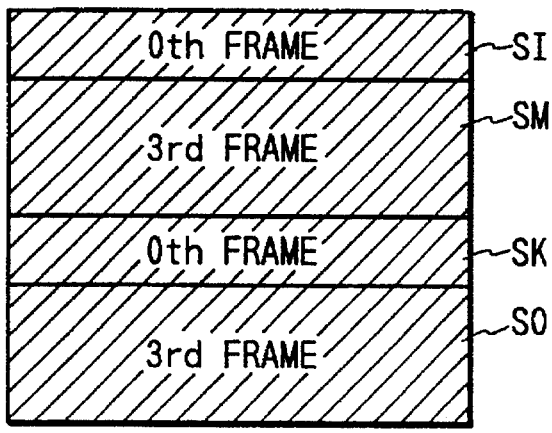
FIG. 16 is a diagram of a composite reproduced image being a resultant of the first and second component reproduced images in connection with the digital VTR of FIGS. 7 and 7A.

It is now assumed that, during the search mode of operation, an image represented by the output signal of the D/A converter 40 is indicated on a display screen. During a first period, data in a 0-th frame is reproduced from only the regions SI and SK in the tracks A0, B0, A1, and B1, and the reproduced data forms image segments on the display screen as shown in FIG. 14. During a next period, data in a 3-rd frame is reproduced from only the regions SM and SO in the tracks A3, B3, A4, and B4, and the reproduced data forms image segments on the display screen as shown in FIG. 15. The image segments related to the regions SI, SK, SM, and SO compose a composite 1-frame image on the display screen as shown in FIG. 16. The composite 1-frame image fully occupies the whole of an effective area of the display screen. Since the composite 1-frame image is formed by the data in only the two different flames, the composite 1-frame image can be better in quality than that formed by data in three or more different flames.

Memories may be used in the combining circuit 140 as in the separation circuit 114.

While one block is composed of 8 by 8 adjacent pixels in this embodiment, one block may be composed of a given number of adjacent pixels which differs from 8 by 8.

While the orthogonal transform circuit 52 executes two-dimensional DCT on the digital video signal in this embodiment, the orthogonal transform circuit 52 may execute other orthogonal transform, three-dimensional DCT, or greater-dimensional DCT.

The variable-length encoding by the encoding circuits 16A and 16B may be changed to another type of variable-length encoding.

The error correction encoding by the error correction encoding circuits 18A and 18B may be changed to another type of error correction encoding.

The zigzag scanning by the orthogonal transform circuit 52 may be replaced by another type of scanning.

While the separation circuit 114 divides the output data from the orthogonal transform circuit 52 into two, the separation circuit 114 may divide the data into three or more processed by an increased number of variable-length encoding circuits respectively.

A switch may be additionally provided which selectively couples the output side of the orthogonal transform circuit 52 with the input side of the variable-length encoding circuit 16A or the input side of the separation circuit 114. In this case, when the switch couples the output side of the orthogonal transform circuit 52 with the input side of the variable-length encoding circuit 16A, the digital VTR operates in a standard image-quality mode. On the other hand, the switch couples the output side of the orthogonal transform circuit 52 with the input side of the separation circuit 114, the digital VTR operates in a high image-quality mode.

The tape speed in the search mode of operation of the digital VTR may be higher than that in the normal playback mode of operation by a factor of 2 or a factor changeable between 2 and 2.5.

The O-data adding function may be omitted from the separation circuit 114.

While a 1-frame image P is divided into an upper half PA and a lower half PB in this embodiment, the 1-frame image P may be divided into three or more. Furthermore, the 1-frame image P may be divided into suitable sub regions different from the upper half PA and the lower half PB.

It is preferable that data composing one frame is recorded on two tracks. Data composing one frame may be recorded on more than two tracks (for example, eight tracks or ten tracks).

DESCRIPTION OF THE THIRD PREFERRED EMBODIMENT

A third embodiment of this invention is similar to the embodiment of FIGS. 7–16 except for design changes indicated hereinafter. A digital VTR according to the third embodiment uses a separation circuit 114A in place of the separation circuit 114 of FIGS. 7 and 8.

Figure 17:
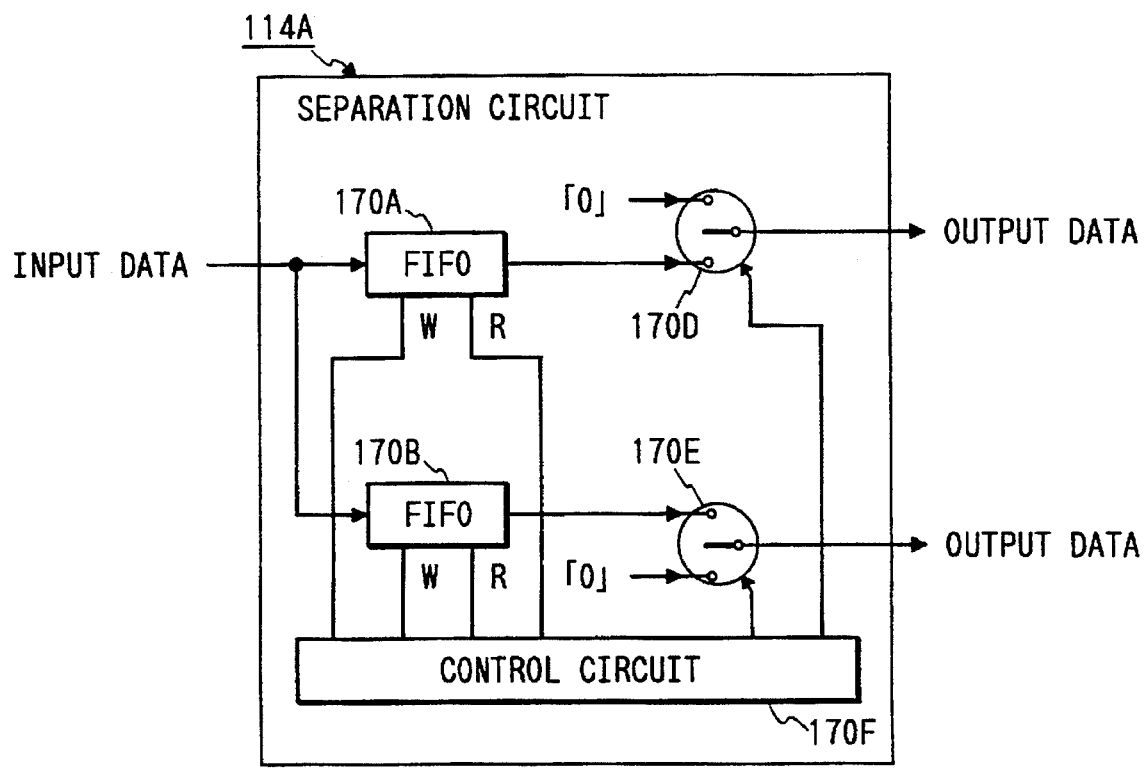
FIG. 17 is a block diagram of a separation circuit in a digital VTR according to a third embodiment of this invention.

FIG. 17 shows the separation circuit 114A. The separation circuit 114A is similar to the separation circuit 114 of FIGS. 7 and 8 except that a control circuit 170F replaces the control circuit 170C (see FIG. 8). The control circuit 170F is designed so that a lowest order DCT coefficient data piece or a dc DCT coefficient data piece D(0) is written into both FIFO memories 170A and 170B, and that subsequent DCT coefficient data pieces D(1), D(2), D(3), . . . , D(62), and D(63) are periodically and alternately written into the FIFO memories 170A and 170B. Specifically, the even-number coefficient data pieces D(0), D(2), . . . , and D(62) are sequentially written into the FIFO memory 170A while the lowest order coefficient data piece or the dc coefficient data piece D(0) and the odd-number coefficient data pieces D(1), D(3), . . . , and D(63) are sequentially written into the FIFO memory 170B. The FIFO memory 170A is periodically controlled by a data reading signal from the control circuit 170F so that the even-number coefficient data pieces D(0), D(2), . . . , and D(62) are sequentially read out therefrom and are applied to a O-data adding switch 170D. Similarly, the FIFO memory 170B is periodically controlled by a data reading signal from the control circuit 170F so that the lowest order coefficient data piece or the dc coefficient data piece D(0) and the odd-number coefficient data pieces D(1), D(3), . . . , and D(63) are sequentially read out therefrom and are applied to a O-data adding switch 170E.

In the separation circuit 114A of FIG. 17, the O-data adding switch 170D is periodically changed by a switch control signal fed from the control circuit 170F. The period and the timing of the switch control signal are designed so that the switch 170D adds a sequence of 32 O-data pieces to the end of the sequence of the even-number coefficient data pieces D(0), D(2), . . . , and D(62). The sequence of the even-number coefficient data pieces D(0), D(2), . . . , and D(62) and the subsequent sequence of the 32 O-data pieces compose a sequence of 64 DCT coefficient data pieces which is handled as one block by a later stage.

In the separation circuit 114A of FIG. 17, the O-data adding switch 170E is periodically changed by a switch control signal fed from the control circuit 170F. The period and the timing of the switch control signal are designed so that the switch 170E adds a sequence of 31 O-data pieces to the end of the sequence of the lowest order coefficient data piece or the dc coefficient data piece D(0) and the odd-number coefficient data pieces D(1), D(3), . . . , and D(63). The sequence of the lowest order coefficient data piece or the dc coefficient data piece D(0) and the odd-number coefficient data pieces D(1), D(3), . . . , and D(63) and the subsequent sequence of the 31 O-data pieces compose a sequence of 64 DCT coefficient data pieces which is handled as one block by a later stage.

Figure 18:
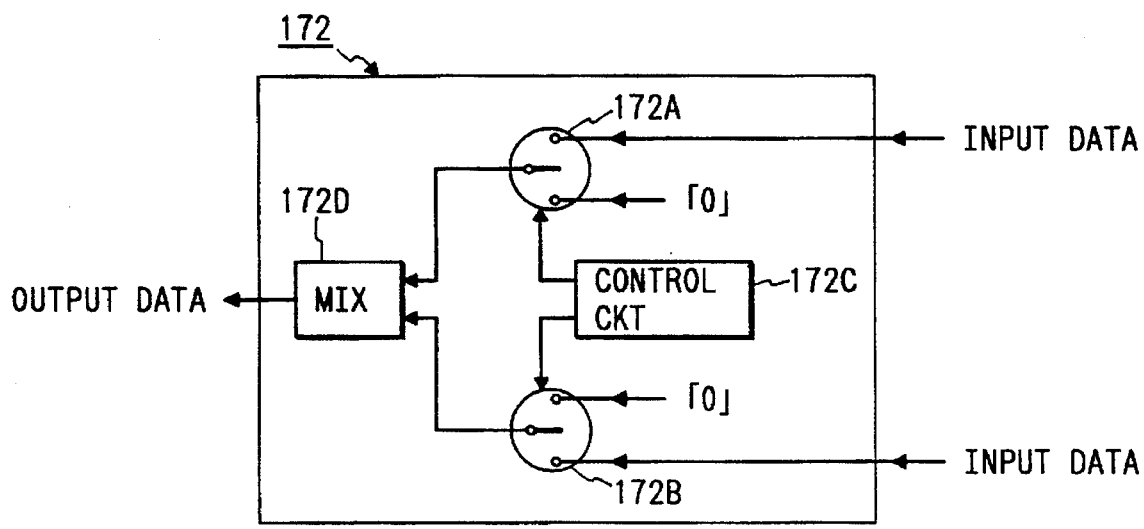
FIG. 18 is a block diagram of a combining circuit in the digital VTR according to the third embodiment.

The digital VTR of this embodiment uses a combining circuit 172 in place of the combining circuit 140 of FIGS. 7 and 9. As shown in FIG. 18, the combining circuit 172 includes O-data adding switches 172A and 172B, a control circuit 172C, and a mixing circuit 172D. A first input side of the switch 172A is connected to the output side of a variable-length decoding circuit 36A (see FIG. 7). A second input side of the switch 172A receives data in a logic state "0" from a data source (not shown). The switch 172A has a common output side. The output side of the switch 172A is selectively connected to the first input side or the second input side thereof in response to a switch control signal fed from the control circuit 172C. The output side of the switch 172A is connected to a first input terminal of the mixing circuit 172D. A first input side of the switch 172B is connected to the output side of a variable-length decoding circuit 36B (see FIG. 7). A second input side of the switch 172B receives the data in the logic state "0" from the data source. The switch 172B has a common output side. The output side of the switch 172B is selectively connected to the first input side or the second input side thereof in response to a switch control signal fed from the control circuit 172C. The output side of the switch 172B is connected to a second input terminal of the mixing circuit 172D. The output terminal of the mixing circuit 172D is connected to the input side of an inverse orthogonal transform circuit 38 (see FIG. 7). The control circuit 172C receives information of whether or not a normal playback mode of operation of the digital VTR is required, and also information of whether or not a search mode of operation of the digital VTR is required. The control circuit 172C operates to control the O-data adding switches 172A and 172B in response to the received information. It should be noted that memories may be used in the combining circuit 140 as in the separation circuit 114 of FIG. 8.

During a normal playback mode of operation of the digital VTR, the output sides of the O-data adding switches 172A and 172B remain connected to the first input sides thereof by the switch control signals from the control circuit 172C. Therefore, the mixing circuit 172D receives a sequence of data pieces D(0), D(2), . . . , and D(62) and subsequent 32 O-data pieces from the variable-length decoding circuit 36A via the switch 172A every block. In addition, the mixing circuit 172D receives a sequence of data pieces D(0), D(1), D(3), . . . , and D(63) and subsequent 31 O-data pieces from the variable-length decoding circuit 36B via the switch 172B every block. The mixing circuit 172D removes the O-data pieces in the latter halves from the received data sequences, and combines the sequence of the data pieces D(0), D(2), . . . , and D(62) and the sequence of the data pieces D(0), D(1), D(3), ..., and D(63) into a sequence of the data pieces D(0), D(1), D(2), D(3), ..., D(62), and D(63). The mixing circuit 172D includes a switch for periodically and alternately selecting one of the two received data. The inverse orthogonal transform circuit 38 receives the sequence of the data pieces D(0), D(1), ..., and D(63) from the mixing circuit 172D every block.

Figure 19:
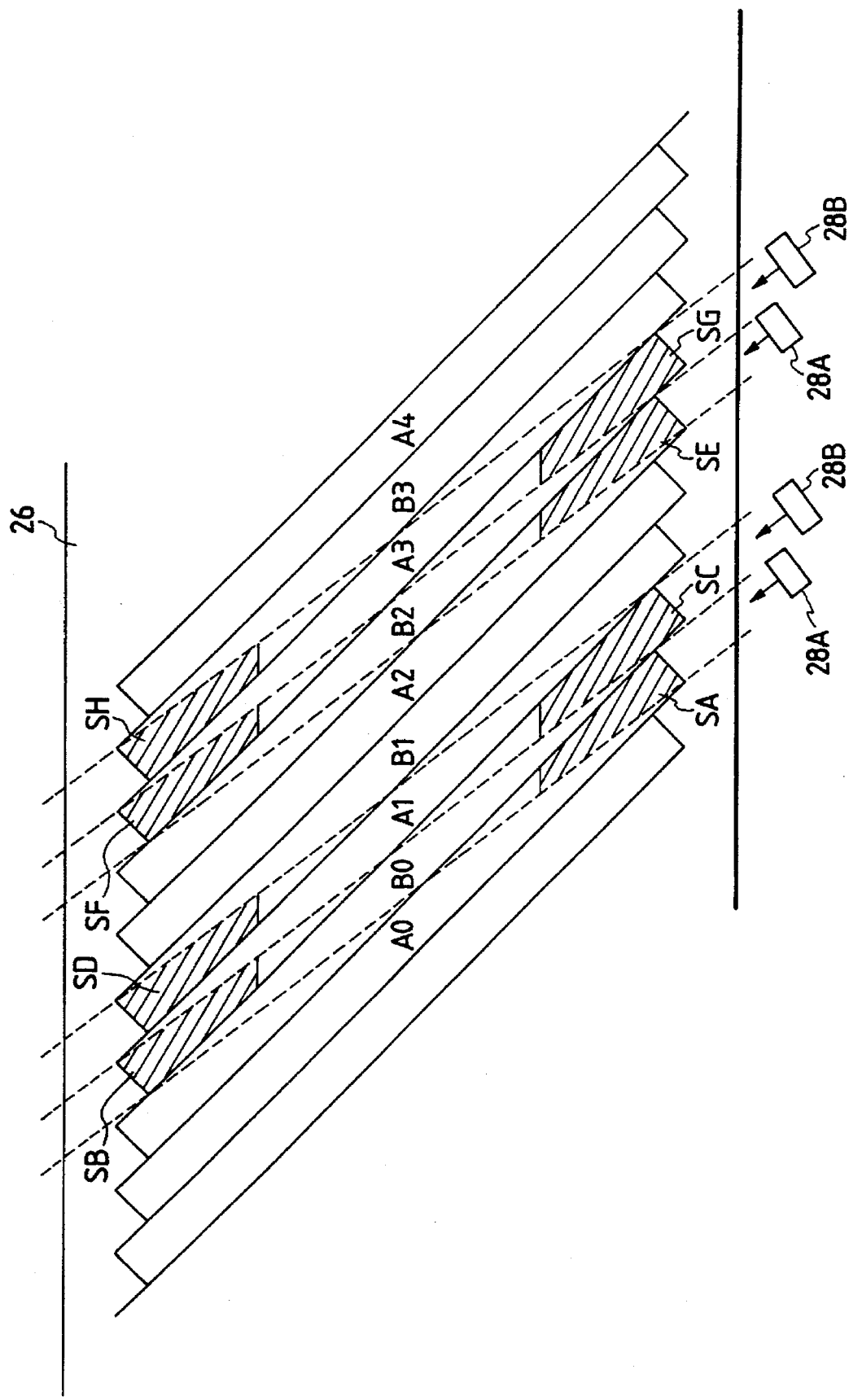
FIG. 19 is a diagram of tracks on a magnetic tape and reproducing heads in the digital VTR according to the third embodiment.

Hereinafter, a description will be given of a search mode of operation of the digital VTR which has a speed (a tape speed or a relative speed between a head assembly and a magnetic tape) higher than the speed in the normal playback mode of operation by a factor of 2. With reference to FIG. 19, during an example of the search mode of operation, a reproducing head 28A reproduces data from a region SA in a track A0, a region SB in a track A1, a region SE in a track A2, and a region SF in a track A3 on a magnetic tape 26. On the other hand, a reproducing head 28B reproduces data from a region SC in a track B0, a region SD in a track B1, a region SG in a track B2, and a region SH in a track B3 on the magnetic tape 26.

During a first period of the search mode of operation for which each sequence of data pieces D(0), D(2), ..., and D(62) and subsequent 32 O-data pieces outputted by the variable-length decoding circuit 36A originate from data reproduced from the region SA or SC in a track on the magnetic tape 26, the output side of the O-data adding switch 172A remains connected to the first input side thereof by the switch control signal from the control circuit 172C while the output side of the O-data adding switch 172B remains connected to the second input side thereof by the switch control signal from the control circuit 172C. Accordingly, the mixing circuit 172D receives a sequence of 64 O-data pieces via the switch 172B every block. In addition, the mixing circuit 172D receives the sequence of the data pieces D(0), D(2), ..., and D(62) and the subsequent 32 O-data pieces from the variable-length decoding circuit 36A via the switch 172A every block. The mixing circuit 172D removes the O-data pieces in the latter halves from the received data sequences, and alternately combines the sequence of the data pieces D(0), D(2), ..., and D(62) and the sequence of the 32 O-data pieces into a sequence of the data pieces D(0), "0", D(2), "0", D(4), "0", D(6), ..., "0", D(62), and "0". The inverse orthogonal transform circuit 38 receives the sequence of the data pieces D(0), "0", D(2), "0", D(4), "0", D(6), ..., "0", D(62), and "0" from the mixing circuit 172D every block.

During a second period of the search mode of operation for which each sequence of data pieces D(0), D(1), D(3), ..., and D(63) and subsequent 31 O-data pieces outputted by the variable-length decoding circuit 36B originate from data reproduced from the region SB or SD in a track on the magnetic tape 26, the output side of the O-data adding switch 172B remains connected to the first input side thereof by the switch control signal from the control circuit 172C while the output side of the O-data adding switch 172A remains connected to the second input side thereof by the switch control signal from the control circuit 172C. Accordingly, the mixing circuit 172D receives a sequence of 64 O-data pieces via the switch 172A every block. In addition, the mixing circuit 172D receives the sequence of the data pieces D(0), D(1), D(3), ..., and D(63) and the subsequent 31 O-data pieces from the variable-length decoding circuit 36B via the switch 172B every block. The mixing circuit 172D removes the O-data pieces in the latter halves from the received data sequences, and alternately combines the sequence of the data pieces D(0), D(1), D(3), ..., and D(63) and the sequence of the 31 O-data pieces into a sequence of the data pieces D(0), D(1), "0", D(3), "0", D(5), "0", D(7), ..., "0", and D(63). The inverse orthogonal transform circuit 38 receives the sequence of the data pieces D(0), D(1), "0", D(3), "0", D(5), "0", D(7), ..., "0", and D(63) from the mixing circuit 172D every block.

In general, the above-indicated processes in the first and second periods of the search mode of operation are reiterated. During the search mode of operation, since the analog video signal outputted from a D/A converter 40 (see FIG. 7) contains information represented by lowest order DCT data or dc component data D(0), the quality of an image represented by the analog video signal is maintained at such a level that the contents of the image can be confirmed.

Figure 20:
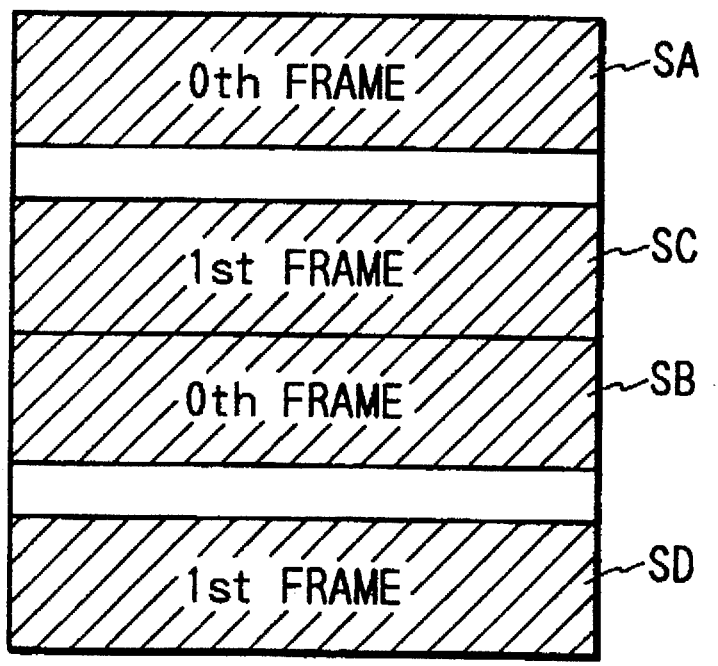
FIG. 20 is a diagram of a reproduced image in connection with the digital VTR according to the third embodiment.

It is now assumed that, during the search mode of operation, an image represented by the output signal of the D/A converter 40 is indicated on a display screen. As shown in FIG. 20, data in a 0-th frame which is reproduced from the regions SA and SC in the tracks A0, B0, A1, and B1 forms image segments on the display screen while data in a 1-st frame which is reproduced from the regions SB and SD in the tracks A0, B0, A1, and B1 forms image segments on the display screen. The image segments related to the regions SA, SB, SC, and SD compose a composite 1-frame image on the display screen. Since the composite 1-frame image is formed by the data in only the two different frames, the composite 1-frame image can be better in quality than that formed by data in three or more different frames.

The tape speed in the search mode of operation of the digital VTR may be higher than that in the normal playback mode of operation by a factor of N+½ where N denotes a given integer. In addition, the tape speed in the search mode of operation of the digital VTR may be higher than that in the normal playback mode of operation by a factor of 2.5 or a factor changeable between 2 and 2.5.

While one block is composed of 8 by 8 adjacent pixels in this embodiment, one block may be composed of a given number of adjacent pixels which differs from 8 by 8.

While the orthogonal transform circuit 52 executes two-dimensional DCT on the digital video signal in this embodiment, the orthogonal transform circuit 52 may execute other orthogonal transform, three-dimensional DCT, or greater-dimensional DCT.

The variable-length encoding by the encoding circuits 16A and 16B may be changed to another type of variable-length encoding.

The error correction encoding by the error correction encoding circuits 18A and 18B may be changed to another type of error correction encoding.

The zigzag scanning by the orthogonal transform circuit 52 may be replaced by another type of scanning.

While the separation circuit 114A divides the output data from the orthogonal transform circuit 52 into two, the separation circuit 114A may divide the data into three or more processed by an increased number of variable-length encoding circuits respectively. In this case, at least two of the three or more division-resultant data sequences contain lowest-order DCT coefficient data D(0).

A switch may be additionally provided which selectively couples the output side of the orthogonal transform circuit 52 with the input side of the variable-length encoding circuit 16A or the input side of the separation circuit 114A. In this case, when the switch couples the output side of the orthogonal transform circuit 52 with the input side of the variable-length encoding circuit 16A, the digital VTR operates in a standard image-quality mode. On the other hand, the switch couples the output side of the orthogonal transform circuit 52 with the input side of the separation circuit 114A, the digital VTR operates in a high image-quality mode.

The O-data adding function may be omitted from the separation circuit 114A.

While a 1-frame image P is divided into an upper half PA and a lower half PB in this embodiment, the 1-frame image P may be divided into three or more. Furthermore, the 1-frame image P may be divided into suitable sub regions different from the upper half PA and the lower half PB.

It is preferable that data composing one frame is recorded on two tracks. Data composing one frame may be recorded on more than two tracks (for example, eight tracks or ten tracks).

DESCRIPTION OF THE FOURTH PREFERRED EMBODIMENT

Figure 21:
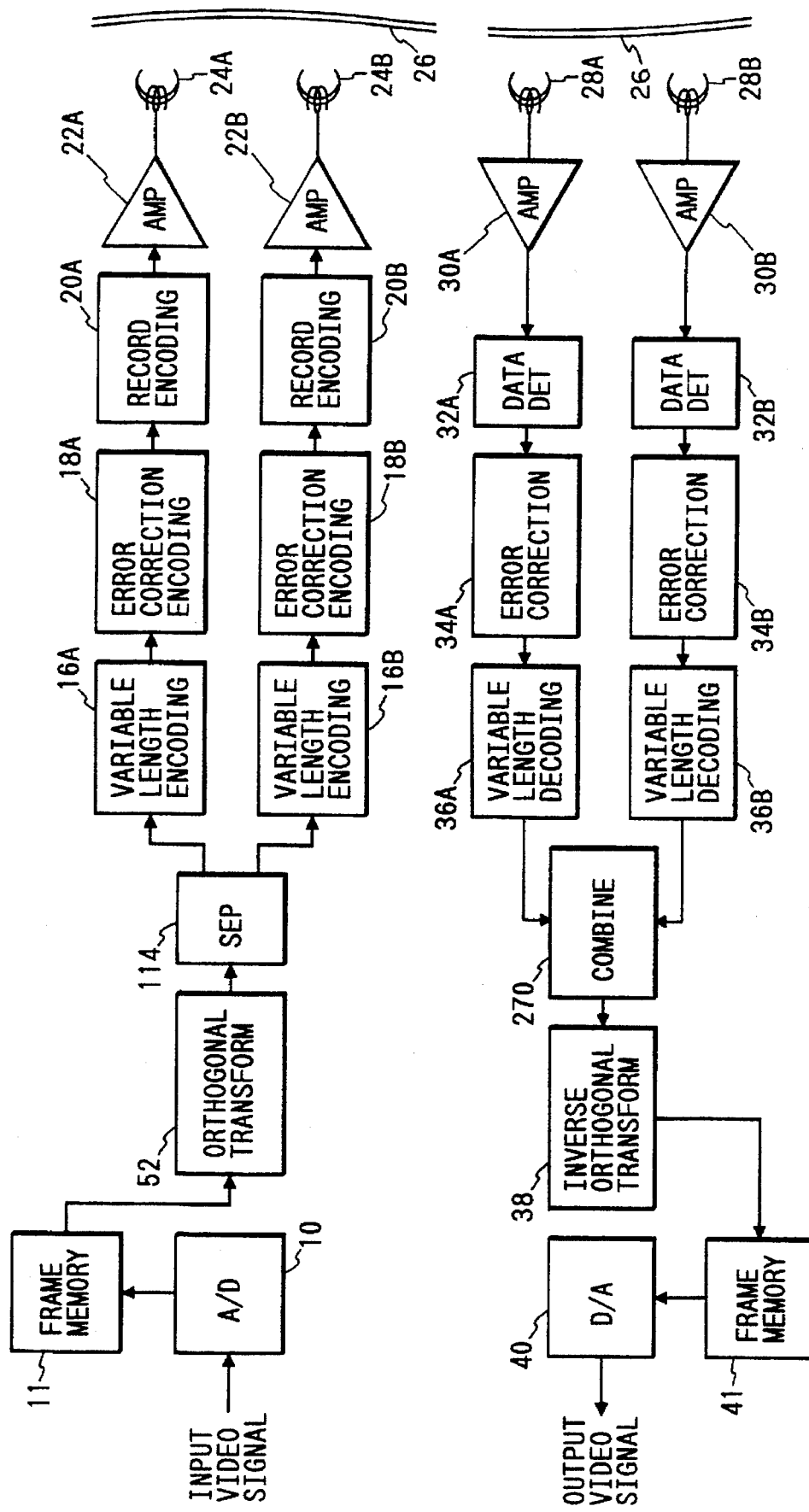

FIG. 21 shows a digital VTR according to a fourth embodiment of this invention which is similar to the embodiment of FIGS. 1–6 except for design changes indicated later.

The embodiment of FIG. 21 uses a separation circuit 114 in place of the separation circuit 54 of FIGS. 1 and 2. The separation circuit 114 has a structure of FIG. 8.

Figure 22:
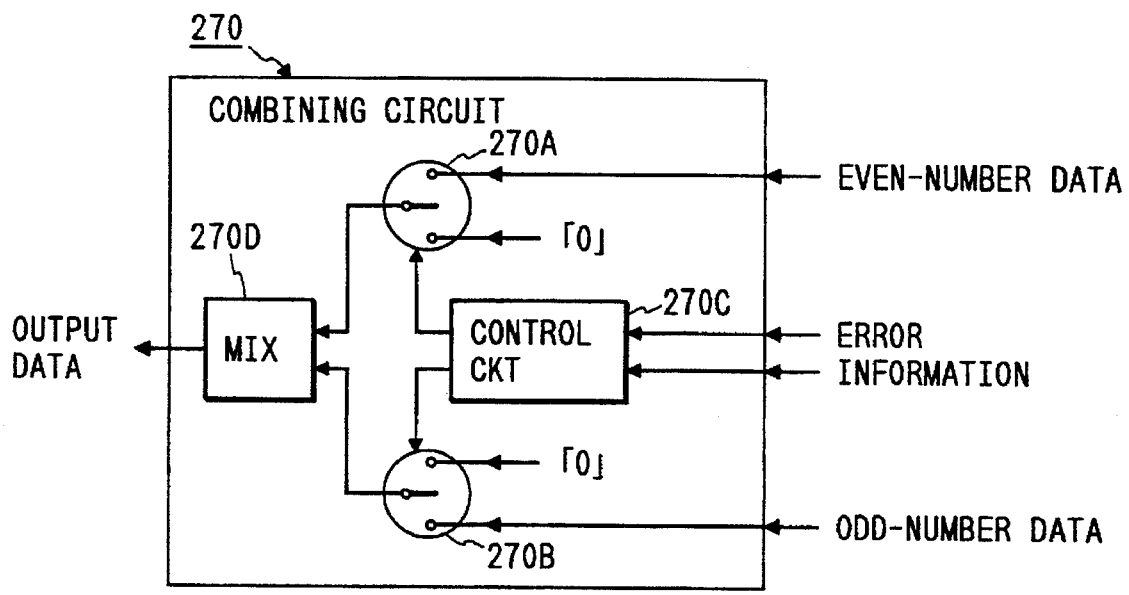
FIG. 22 is a block diagram of a combining circuit in FIGS. 21 and 21A.

The embodiment of FIG. 21 uses a combining circuit 270 in place of the mixing circuit 56 of FIG. 1. As shown in FIG. 22, the combining circuit 270 includes O-data adding switches 270A and 270B, a control circuit 270C, and a mixing circuit 270D. A first input side of the switch 270A is connected to the output side of a variable-length decoding circuit 36A (see FIG. 21). A second input side of the switch 270A receives data in a logic state "0" from a data source (not shown). The switch 270A has a common output side. The output side of the switch 270A is selectively connected to the first input side or the second input side thereof in response to a switch control signal fed from the control circuit 270C. The output side of the switch 270A is connected to a first input terminal of the mixing circuit 270D. A first input side of the switch 270B is connected to the output side of a variable-length decoding circuit 36B (see FIG. 21). A second input side of the switch 270B receives the data in the logic state "0" from the data source. The switch 270B has a common output side. The output side of the switch 270B is selectively connected to the first input side or the second input side thereof in response to a switch control signal fed from the control circuit 270C. The output side of the switch 270B is connected to a second input terminal of the mixing circuit 270D. The output terminal of the mixing circuit 270D is connected to the input side of an inverse orthogonal transform circuit 38 (see FIG. 21). The control circuit 270C is connected to error correction circuits 34A and 34B to receive error-correction information therefrom. The control circuit 270C operates to control the O-data adding switches 270A and 270B in response to the error-correction information. It should be noted that memories may be used in the combining circuit 270 as in the separation circuit 114 of FIG. 8.

Figure 23:
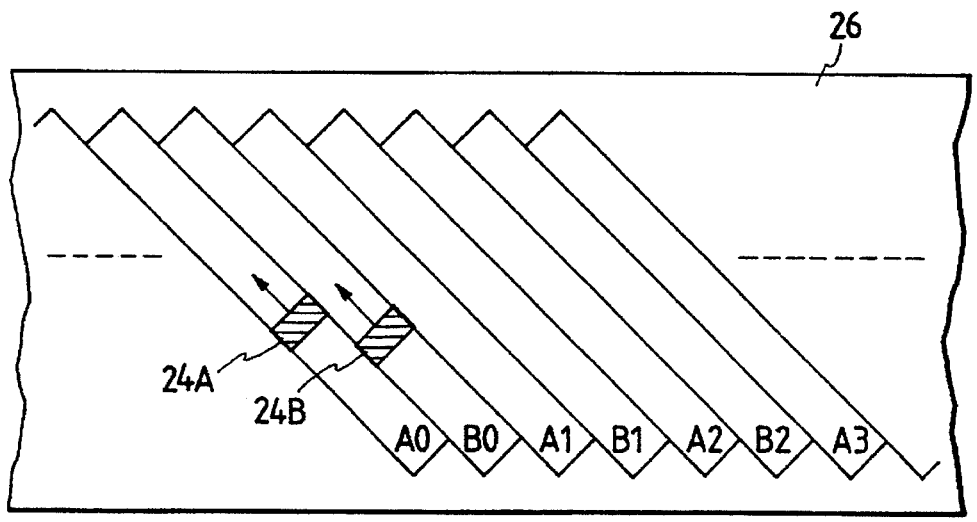
FIG. 23 is a diagram of tracks on a magnetic tape and recording heads in the digital VTR of FIGS. 21 and 21A.

During a recording mode of operation of the digital VTR, output data sequences from record encoding circuits 20A and 20B are recorded on different tracks in a magnetic tape 26 via recording heads 24A and 24B and amplifiers 22A and 22B respectively as shown in FIG. 23. A head assembly including the recording heads 24A and 24B, and a tape drive mechanism are designed so that the head assembly can scan the magnetic tape 26 in a given helical scanning format. The recording heads 24A and 24B are adjacent to each other.

Therefore, two neighboring tracks store information recorded by the recording head 24A and information recorded by the recording head 24B respectively. Generally, two adjacent tracks store all data composing one frame. The recording heads 24A and 24B have azimuths opposite to each other.

During a normal playback mode of operation of the digital VTR, an error correction circuit 34A receives output data from a data detection circuit 32A, and subjects the received data to processing inverse with respect to encoding by an error correction encoding circuit 18A. Specifically, the error correction circuit 34A detects errors in the received data and corrects the errors. A variable-length decoding circuit 36A receives the output data from the error correction circuit 34A.

The error correction circuit 34A decides whether or not the output data from the data detection circuit 32A has an error, and also decides whether an error in the output data from the data detection circuit 32A has been successfully corrected. In addition, the error correction circuit 34A decides whether or not error detection is difficult. When the output data from the data detection circuit 32A does not have any error or when an error in the output data from the data detection circuit 32A has been successfully corrected, the error correction circuit 34A outputs first error correction information which represents the absence of an error. When the output data from the data detection circuit 34A has an error but the correction of the error fails, the error correction circuit 34A outputs second error correction information which represents the presence of an error. When error detection is difficult, the error correction circuit 34A outputs third error correction information which represents a chance of an error. The first error correction information, the second error correction information, and the third error correction information are fed to the control circuit 270C in the combining circuit 270.

During the normal playback mode of operation, an error correction circuit 34B receives output data from a data detection circuit 32B, and subjects the received data to processing inverse with respect to encoding by an error correction encoding circuit 18B. Specifically, the error correction circuit 34B detects errors in the received data and corrects the errors. A variable-length decoding circuit 36B receives the output data from the error correction circuit 34B.

The error correction circuit 34B decides whether or not the output data from the data detection circuit 32B has an error, and also decides whether an error in the output data from the data detection circuit 32B has been successfully corrected. In addition, the error correction circuit 34B decides whether or not error detection is difficult. When the output data from the data detection circuit 32B does not have any error or when an error in the output data from the data detection circuit 32B has been successfully corrected, the error correction circuit 34B outputs first error correction information which represents the absence of an error. When the output data from the data detection circuit 34B has an error but the correction of the error fails, the error correction circuit 34B outputs second error correction information which represents the presence of an error. When error detection is difficult, the error correction circuit 34B outputs third error correction information which represents a chance of an error. The first error correction information, the second error correction information, and the third error correction information are fed to the control circuit 270C in the combining circuit 270.

During the normal playback mode of operation, when the control circuit 270C in the combining circuit 270 is informed by the error correction circuits 34A and 34B that output data sequences from the variable-length decoding circuits 36A and 36B do not have any error, the output sides of the O-data adding switches 270A and 270B remain connected to the first input sides thereof by the switch control signals from the control circuit 270C. Therefore, the mixing circuit 270D receives a sequence of data pieces D(0), D(2), ..., and D(62) and subsequent 32 O-data pieces from the variable-length decoding circuit 36A via the switch 270A every block. In addition, the mixing circuit 270D receives a sequence of data pieces D(1), D(3), ..., and D(63) and subsequent 32 O-data pieces from the variable-length decoding circuit 36B via the switch 270B every block. The mixing circuit 270D removes the O-data pieces in the latter halves from the received data sequences, and combines the sequence of the data pieces D(0), D(2), ..., and D(62) and the sequence of the data pieces D(1), D(3), ..., and D(63) into a sequence of the data pieces D(0), D(1), D(2), D(3), . . ., D(62), and D(63). The mixing circuit 270D includes a switch for periodically and alternately selecting one of the two received data. The inverse orthogonal transform circuit 38 receives the sequence of the data pieces D(0), D(1), ... , and D(63) from the mixing circuit 270D every block.

During the normal playback mode of operation, when the control circuit 270C in the combining circuit 270 is informed by the error correction circuit 34A that an output data sequence from the variable-length decoding circuit 36A has an error or a chance of an error, the output side of the O-data adding switch 270B remains connected to the first input side thereof by the switch control signal from the control circuit 270C while the output side of the O-data adding switch 270A remains connected to the second input side thereof by the switch control signal from the control circuit 270C. Accordingly, the mixing circuit 270D receives a sequence of 64 O-data pieces via the switch 270A for one block. In addition, the mixing circuit 270D receives the sequence of the data pieces D(1), D(3), ..., and D(63) and the subsequent 32 O-data pieces from the variable-length decoding circuit 36B via the switch 270B for one block. The mixing circuit 270D removes the O-data pieces in the latter halves from the received data sequences, and alternately combines the sequence of the data pieces D(1), D(3), ..., and D(63) and the sequence of the 32 O-data pieces into a sequence of the data pieces "0", D(1), "0", D(3), "0", D(5), "0", D(7), ..., "0", and D(63). The inverse orthogonal transform circuit 38 receives the sequence of the data pieces "0", D(1), "0", D(3), "0", D(5), "0", D(7), ..., "0", and D(63) from the mixing circuit 172D for one block.

During the normal playback mode of operation, when the control circuit 270C in the combining circuit 270 is informed by the error correction circuit 34B that an output data sequence from the variable-length decoding circuit 36B has an error or a chance of an error, the output side of the O-data adding switch 270A remains connected to the first input side thereof by the switch control signal from the control circuit 270C while the output side of the O-data adding switch 270B remains connected to the second input side thereof by the switch control signal from the control circuit 270C. Accordingly, the mixing circuit 270D receives a sequence of 64 O-data pieces via the switch 270B for one block. In addition, the mixing circuit 270D receives the sequence of the data pieces D(0), D(2), ..., and D(62) and the subsequent 32 O-data pieces from the variable-length decoding circuit 36A via the switch 270A for one block. The mixing circuit 270D removes the O-data pieces in the later halves from the received data sequences, and alternately combines the sequence of the data pieces D(0), D(2), ..., and D(62) and the sequence of the 32 O-data pieces into a sequence of the data pieces D(0), "0", D(2), "0", D(4), "0", D(6), ..., "0", D(62), and "0". The inverse orthogonal transform circuit 38 receives the sequence of the data pieces D(0), "0", D(2), "0", D(4), "0", D(6), ..., "0", D(62), and "0" from the mixing circuit 270D for one block.

Hereinafter, a description will be given of a search mode of operation of the digital VTR which has a speed (a tape speed or a relative speed between the head assembly and the magnetic tape) higher than the speed in the normal playback mode of operation by a factor of 2.5. With reference to FIG. 12, during an example of the search mode of operation, a reproducing head 28A starts tracing at a track A0 and then crosses tracks B0 and A1 before terminating the tracing at a track B1. On the other hand, a reproducing head 28B starts tracing at the track B0 and then crosses the tracks A1 and B1 before terminating the tracing at a track A2. During this period, the reproducing head 28A reproduces data from a region SI in the track A0 and a region SJ in the track A1. On the other hand, the reproducing head 28B reproduces data from a region SK in the track B0 and a region SL in the track B1.

During a subsequent stage of the search mode of operation, the reproducing head 28A starts tracing at a track B2 and then crosses tracks A3 and B3 before terminating the tracing at a track A4. On the other hand, the reproducing head 28B starts tracing at the track A3 and then crosses the tracks B3 and A4 before terminating the tracing at a track B4. During this period, the reproducing head 28A reproduces data from a region SM in the track A3 and a region SN in the track A4. On the other hand, the reproducing head 28B reproduces data from a region SO in the track B3 and a region SP in the track B4.

Figure 24:
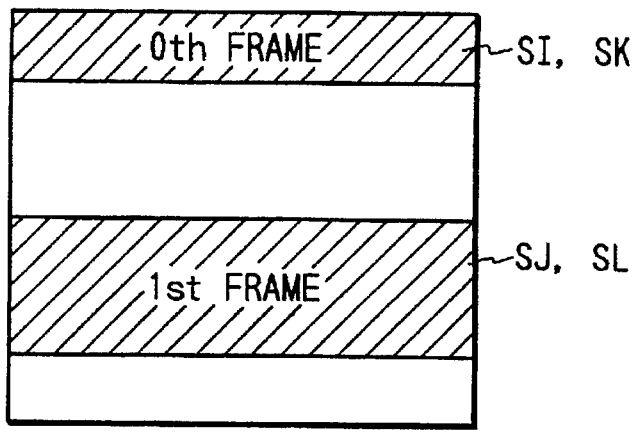
FIG. 24 is a diagram of a first component reproduced image in connection with the digital VTR of FIGS. 21 and 21A.
Figure 25:
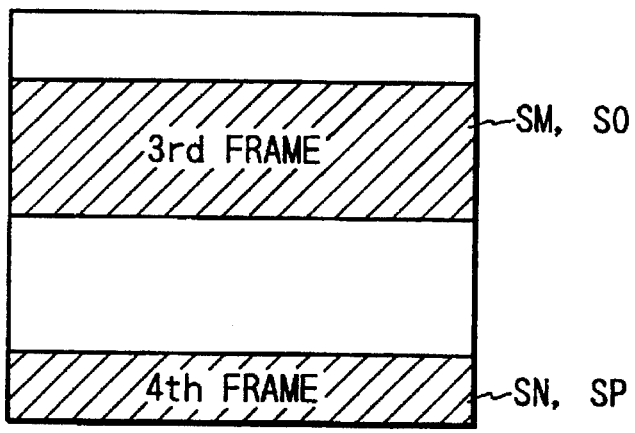
FIG. 25 is a diagram of a second component reproduced image in connection with the digital VTR of FIGS. 21 and 21A.
Figure 26:
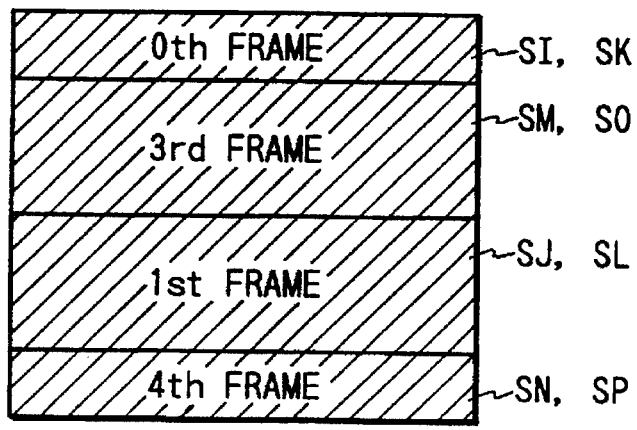
FIG. 26 is a diagram of a composite reproduced image being a resultant of the first and second component reproduced images in connection with the digital VTR of FIGS. 21 and 21A.

It is now assumed that, during the search mode of operation, an image represented by the output signal of a D/A converter 40 is indicated on a display screen. Information related to even-number coefficient data pieces has been recorded on the tracks A0, A1, A2, A3, and A4 in the magnetic tape 26 by the recording head 24A. Information related to odd-number coefficient data pieces has been recorded on the tracks B0, B1, B2, B3, and B4 in the magnetic tape 26 by the recording head 24B. During a first period of the search mode of operation, data in a 0-th frame is reproduced from the regions SI and SK in the tracks A0 and B0, and data in a 1-st frame is reproduced from the regions SJ and SK in the tracks A1 and B1. In this case, the reproduced data forms image segments on the display screen as shown in FIG. 24. During a next period, data in a 3-rd frame is reproduced from the regions SM and SO in the tracks A3 and B3, and data in a 4-th frame is reproduced from the regions SN and SP in the tracks A4 and B4. In this case, the reproduced data forms image segments on the display screen as shown in FIG. 25. The image segments related to the regions SI, SK, SJ, SL, SM, SO, SN, and SP compose a composite 1-frame image on the display screen as shown in FIG. 26. The composite 1-frame image fully occupies the whole of an effective area of the display screen.

A description will now be given of the case where, during the search mode of operation, the error correction circuit 34A informs the control circuit 270C in the combining circuit 270 of the presence of an error or a chance of an error in the output data sequence from the variable-length decoding circuit 36A which corresponds to data reproduced from the region SI in the track A0, the region SJ in the track A1, the region SM in the track A3, or the region SN in the track A4. In this case, the output side of the O-data adding switch 270B is connected to the first input side thereof by the switch control signal from the control circuit 270C while the output side of the O-data adding switch 270A is connected to the second input side thereof by the switch control signal from the control circuit 270C. Accordingly, the mixing circuit 270D receives a sequence of 64 O-data pieces via the switch 270A for one block. In addition, the mixing circuit 270D receives the sequence of the data pieces D(1), D(3), ..., and D(63) and the subsequent 32 O-data pieces from the variable-length decoding circuit 36B via the switch 270B for one block. The mixing circuit 270D removes the O-data pieces in the latter halves from the received data sequences, and alternately combines the sequence of the data pieces D(1), D(3), ..., and D(63) and the sequence of the 32 O-data pieces into a sequence of the data pieces "0", D(1), "0", D(3), "0", D(5), "0", D(7), ..., "0", and D(63). The inverse orthogonal transform circuit 38 receives the sequence of the data pieces "0", D(1), "0", D(3), "0", D(5), "0", D(7), ..., "0", and D(63) from the mixing circuit 270D for one block.

A description will now be given of the case where, during the search mode of operation, the error correction circuit 34B informs the control circuit 270C in the combining circuit 270 of the presence of an error or a chance of an error in the output data sequence from the variable-length decoding circuit 36B which corresponds to data reproduced from the region SK in the track B0, the region SL in the track B1, the region SO in the track B3, or the region SP in the track B4. In this case, the output side of the O-data adding switch 270A is connected to the first input side thereof by the switch control signal from the control circuit 270C while the output side of the O-data adding switch 270B is connected to the second input side thereof by the switch control signal from the control circuit 270C. Accordingly, the mixing circuit 270D receives a sequence of 64 O-data pieces via the switch 270B for one block. In addition, the mixing circuit 270D receives the sequence of the data pieces D(0), D(2), ..., and D(62) and the subsequent 32 O-data pieces from the variable-length decoding circuit 36A via the switch 270A for one block. The mixing circuit 270D removes the O-data pieces in the latter halves from the received data sequences, and alternately combines the sequence of the data pieces D(0), D(2), ..., and D(62) and the sequence of the 32 O-data pieces into a sequence of the data pieces D(0), "0", D(2), "0", D(4), "0", D(6), ..., "0", D(62), and "0". The inverse orthogonal transform circuit 38 receives the sequence of the data pieces D(0), "0", D(2), "0", D(4), "0", D(6), ..., "0", D(62), and "0" from the mixing circuit 270D for one block.

As understood from the previous description, when one of the output data sequences from the variable-length decoding circuits 36A and 36B has an error or a chance of an error during the search mode of operation of the digital VTR, the combining circuit 270 enables the transmission of the error-free data sequence to the inverse orthogonal transform circuit 38 while inhibiting the transmission of the erroneous data sequence thereto. Therefore, an image is reproduced on the basis of the error-free data sequence so that the quality of the image can be maintained at an acceptable level.

While one block is composed of 8 by 8 adjacent pixels in this embodiment, one block may be composed of a given number of adjacent pixels which differs from 8 by 8.

While an orthogonal transform circuit 52 executes two-dimensional DCT on the digital video signal in this embodiment, the orthogonal transform circuit 52 may execute other orthogonal transform, three-dimensional DCT, or greater-dimensional DCT.

Variable-length encoding by encoding circuits 16A and 16B may be changed to another type of variable-length encoding.

The error correction encoding by the error correction encoding circuits 18A and 18B may be changed to another type of error correction encoding.

The zigzag scanning by the orthogonal transform circuit 52 may be replaced by another type of scanning.

While the separation circuit 114 divides the output data from the orthogonal transform circuit 52 into two, the separation circuit 114 may divide the data into three or more processed by an increased number of variable-length encoding circuits respectively.

A switch may be additionally provided which selectively couples the output side of the orthogonal transform circuit 52 with the input side of the variable-length encoding circuit 16A or the input side of the separation circuit 114. In this case, when the switch couples the output side of the orthogonal transform circuit 52 with the input side of the variable-length encoding circuit 16A, the digital VTR operates in a standard image-quality mode. On the other hand, the switch couples the output side of the orthogonal transform circuit 52 with the input side of the separation circuit 114, the digital VTR operates in a high image-quality mode.

The tape speed in the search mode of operation of the digital VTR may be higher than that in the normal playback mode of operation by a factor of 2 or a factor changeable between 2 and 2.5.

The O-data adding function may be omitted from the separation circuit 114.

While the embodiment of this invention relates to the digital VTR, this invention may be applied to another digital video recording and reproducing apparatus such as a video disk recorder.

While data composing one frame is recorded on two tracks in this embodiment, data composing one frame may be recorded on more than two tracks (for example, eight tracks or ten tracks).

DESCRIPTION OF THE FIFTH PREFERRED EMBODIMENT

Figures 27, 27A:
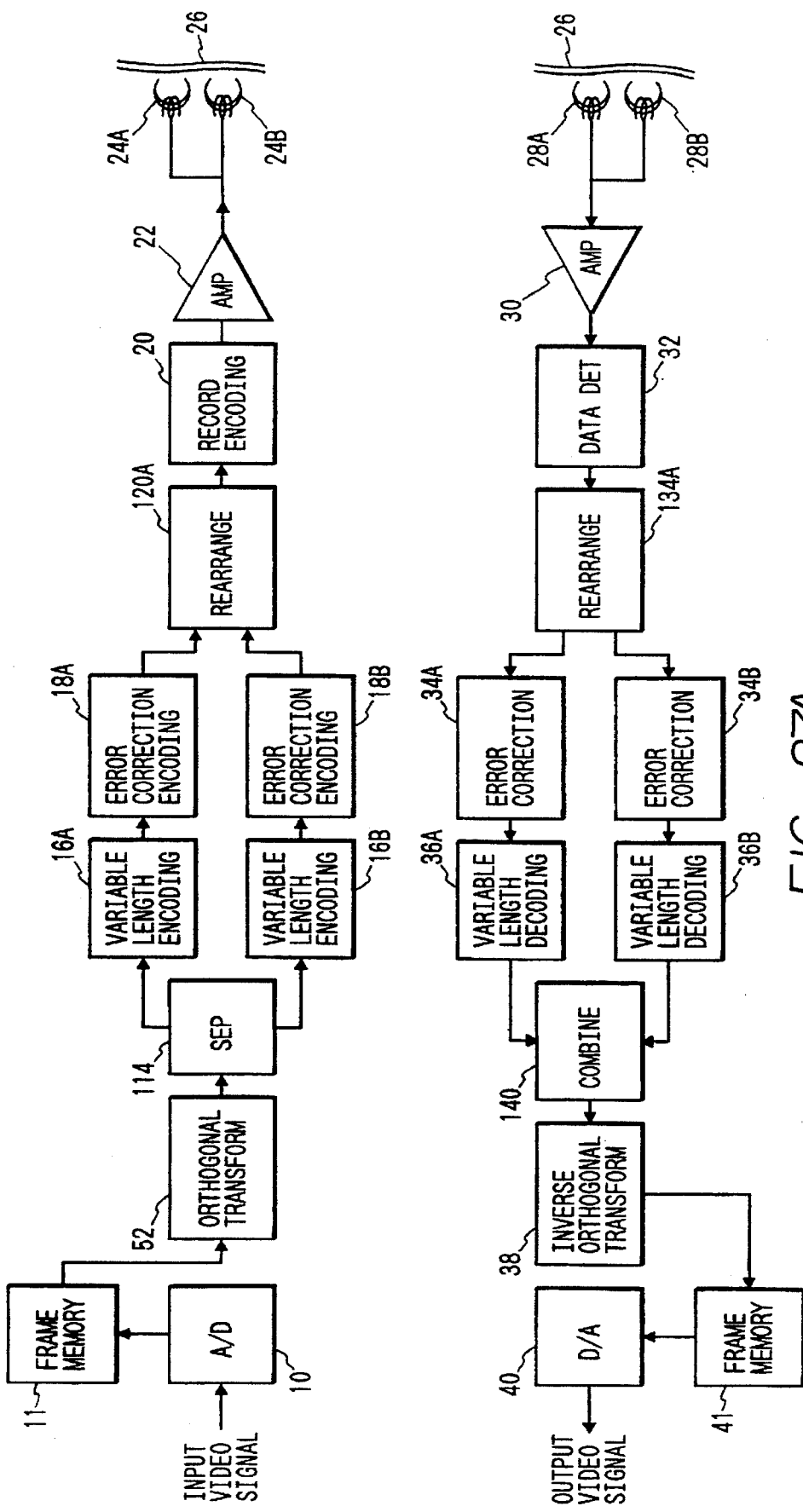
FIGS. 27 and 27A are a block diagram of a digital VTR according to a fifth embodiment of this invention.

FIG. 27 shows a fifth embodiment of this invention which is similar to the embodiment of FIGS. 7-16 except for design changes indicated hereinafter. A digital VTR according to the fifth embodiment uses a data rearranging circuit 120A in place of the data rearranging circuit 120 of FIG. 7.

The data rearranging circuit 120A is connected among error correction encoding circuits 18A and 18B and a record encoding circuit 20. The rearranging circuit 120A receives an output data sequence from the error encoding circuit 18A which relates to even-number coefficient data pieces D(0), D(2), ..., and D(62). Also, the rearranging circuit 120A receives an output data sequence from the error encoding circuit 18B which relates to odd-number coefficient data pieces D(1), D(3), ..., and D(63). The rearranging circuit 120A rearranges data pieces in the received data sequences and thereby makes the received data sequences into a new data sequence which is outputted to the record encoding circuit 20. The rearranging circuit 120A includes, for example, a frame memory or a field memory, and a controller for data writing into and data readout from the memory.

The output side of the data rearranging circuit 120A is connected to the input side of the record encoding circuit 20. The record encoding circuit 20 is similar to the record encoding circuit 20A or 20B of FIG. 7. The output side of the record encoding circuit 20 is connected to the input side of an amplifier 22. The amplifier 22 is similar to the amplifier 22A or 22B of FIG. 7. The output side of the amplifier 22 is connected to recording heads 24A and 24B. The recording heads 24A and 24B are diametrically opposed to each other on a cylinder of a head assembly. In other words, the recording heads 24A and 24B are spaced from each other by an angle of 180 degrees.

As shown in FIG. 10, a 1-frame image P is divided into an upper half PA and a lower half PB. The data rearranging circuit 120A is designed so that information representing the upper half image PA and information representing the lower half image PB will be fed to recording heads 24A and 24B respectively and will be recorded on different tracks in a magnetic tape 26 respectively. As shown in FIG. 11, each of tracks on the magnetic tape 26 is divided into an upper half VH and a lower half VL. The data rearranging circuit 120A is designed so that information relating to sequences of even-number coefficient data pieces D(0), D(2), . . . , and D(62) will be recorded on a track lower half VL while information relating to sequences of odd-number coefficient data pieces D(1), D(3), . . . , and D(63) will be recorded on a track upper half VH.

Figure 28:
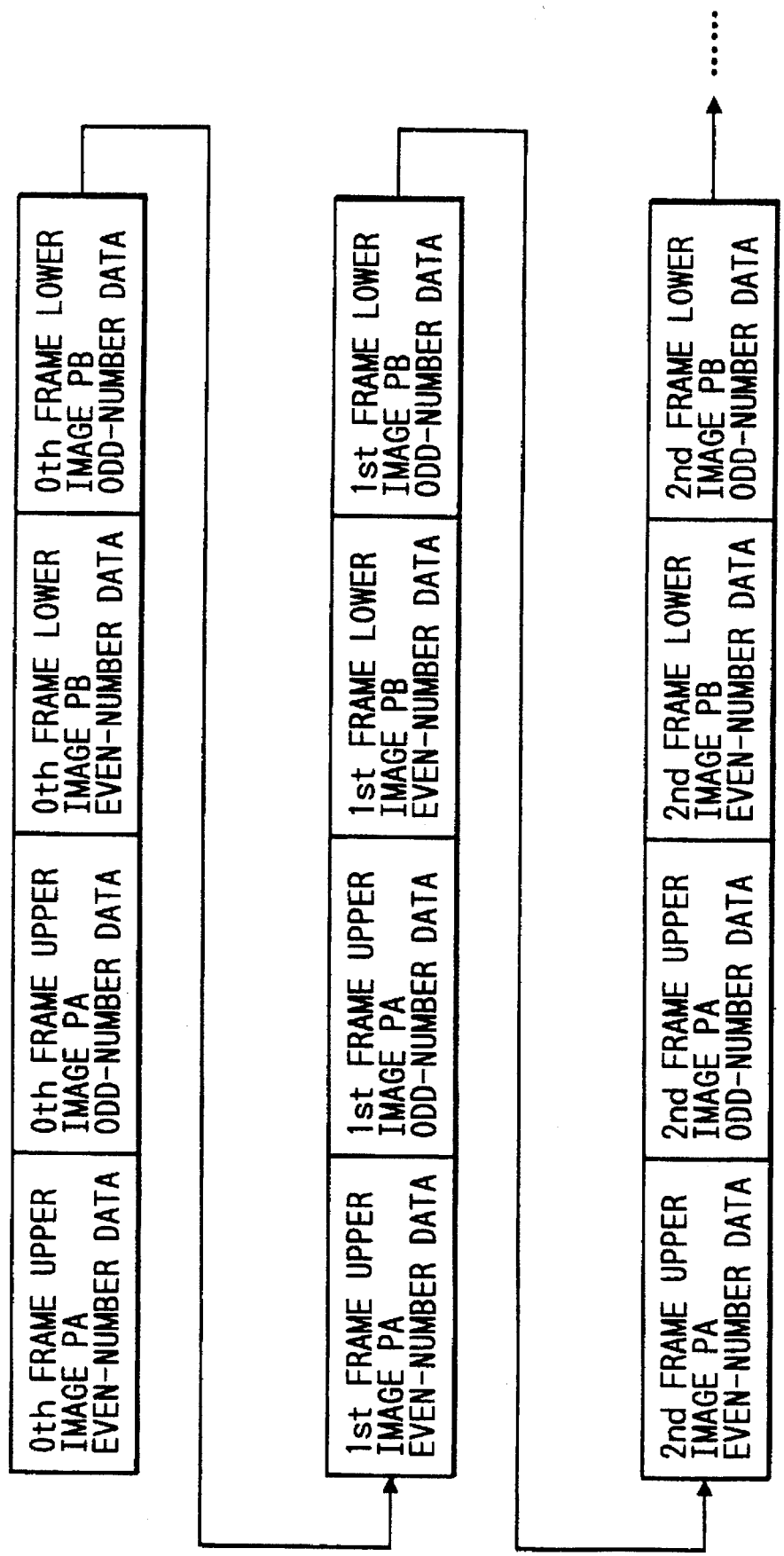
FIG. 28 is a time-domain diagram of a data sequence outputted from a data rearranging circuit in FIGS. 27 and 27A.

As previously described, the rearranging circuit 120A rearranges data pieces in the output data sequences from the error correction encoding circuits 18A and 18B and thereby makes the data sequences into a new data sequence which is outputted to the record encoding circuit 20. Specifically, as a new data sequence fed to the record encoding circuit 20, the rearranging circuit 120A sequentially outputs first information, second information, third information, and fourth information every frame. With reference to FIG. 28, the first information relates to sequences of even-number coefficient data pieces D(0), D(2), . . . , and D(62) which represent an upper half image PA of a frame. The second information relates to sequences of odd-number coefficient data pieces D(1), D(3), . . . , and D(63) which represent the upper half image PA of the frame. The third information relates to sequences of even-number coefficient data pieces D(0), D(2), . . . , and D(62) which represent a lower half image PB of the frame. The fourth information relates to sequences of odd-number coefficient data pieces D(1), D(3), . . . , and D(63) which represent the lower half image PB of the frame.

The above-indicated first information and second information outputted from the rearranging circuit 120A are transmitted to the recording head 24A via the record encoding circuit 20 and the amplifier 22, being recorded via the recording head 24A on the magnetic tape 26. In addition, the above-indicated third information and fourth information outputted from the rearranging circuit 120A are transmitted to the recording head 24B via the record encoding circuit 20 and the amplifier 22, being recorded via the recording head 24B on the magnetic tape 26. Thus, information relating to sequences of even-number coefficient data pieces D(0), D(2), . . . , and D(62) which represent an upper half image PA of a frame is recorded on the lower half VL of a track A0 via the recording head 24A (see FIG. 11). Information relating to sequences of odd-number coefficient data pieces D(1), D(3), . . . , and D(63) which represent the upper half image PA of the frame is recorded on the upper half VH of the track A0 via the recording head 24A (see FIG. 11). In addition, information relating to sequences of even-number coefficient data pieces D(0), D(2), . . . , and D(62) which represent a lower half image PB of the frame is recorded on the lower half VL of a track B0 via the recording head 24B (see FIG. 11). Information relating to sequences of odd-number coefficient data pieces D(1), D(3), . . . , and D(63) which represent the lower half image PB of the frame is recorded on the upper half VH of the track B0 via the recording head 24B (see FIG. 11).

Similarly, image information of a next frame and image information of later flames are sequentially recorded on subsequent tracks A1, B1, A2, B2, . . . (see FIG. 11).

In the embodiment of FIG. 27, reproducing heads 28A and 28B are diametrically opposed to each other on the cylinder of the head assembly. In other words, the reproducing heads 28A and 28B are spaced from each other by an angle of 180 degrees. The reproducing heads 28A and 28B are connected to the input side of an amplifier 30. The amplifier 30 is similar to the amplifier 30A or 30B of FIG. 7. The output side of the amplifier 30 is connected to the input side of a data detection circuit 32. The data detection circuit 32 is similar to the data detection circuit 32A or 32B of FIG. 7.

The embodiment of FIG. 27 uses a data rearranging circuit 134A in place of the data rearranging circuit 134 of FIG. 7. The data rearranging circuit 134A is connected among the data detection circuit 32 and error correction circuits 34A and 34B. The rearranging circuit 134A receives an output data sequence from the data detection circuit 32. The rearranging circuit 134A rearranges data pieces in the received data sequence and thereby makes the received data sequence into first and second new data sequences which are outputted to the error correction circuits 34A and 34B respectively. The first new data sequence outputted to the error correction circuit 34A corresponds to the data sequence outputted from the error correction encoding circuit 18A, and relates to even-number coefficient data pieces D(0), D(2), . . . , and D(62). The second new data sequence outputted to the error correction circuit 34B corresponds to the data sequence outputted from the error correction encoding circuit 18B, and relates to odd-number coefficient data pieces D(1), D(3), . . . , and D(63). The function of the rearranging circuit 134A is inverse with respect to the function of the rearranging circuit 120A. The rearranging circuit 134A includes, for example, a frame memory or a field memory, and a controller for data writing into and data readout from the memory.

A normal playback mode of operation of the digital VTR will be described hereinafter. During the normal playback mode of operation, the reproducing head 28A operates to reproduce data from the magnetic tape 26 which has been recorded by the recording head 24A. Accordingly, the reproduced data contains a sequence of first information and second information every frame. The first information relates to sequences of even-number coefficient data pieces D(0), D(2), . . . , and D(62) which represent an upper half image PA of a frame. The second information relates to sequences of odd-number coefficient data pieces D(1), D(3), . . . , and D(63) which represent the upper half image PA of the frame. The reproduced data is fed from the reproducing head 28A to the data detection circuit 32 via the amplifier 30. On the other hand, the reproducing head 28B operates to reproduce data from the magnetic tape 26 which has been recorded by the recording head 24B. Accordingly, the reproduced data contains a sequence of third information and fourth information every frame. The third information relates to sequences of even-number coefficient data pieces D(0), D(2), . . . , and D(62) which represent a lower half image PB of the frame. The fourth information relates to sequences of odd-number coefficient data pieces D(1), D(3), . . . , and D(63) which represent the lower half image PB of the frame. The reproduced data is fed from the reproducing head 28B to the data detection circuit 32 via the amplifier 30.

The data detection circuit 32 subjects the reproduced data to processing inverse with respect to the encoding by the record encoding circuit 20. The rearranging circuit 134A receives the output data sequence from the data detection circuit 32 which represents an upper half image PA and a lower half image PB of every frame. The rearranging circuit 134A rearranges data pieces in the received data sequence and thereby makes the received data sequence into first and second new data sequences which are outputted to the error correction circuits 34A and 34B respectively. The first new data sequence outputted to the error correction circuit 34A corresponds to the data sequence outputted from the error correction encoding circuit 18A, and relates to even-number coefficient data pieces D(0), D(2), . . . , and D(62). The second new data sequence outputted to the error correction circuit 34B corresponds to the data sequence outputted from the error correction encoding circuit 18B, and relates to odd-number coefficient data pieces D(1), D(3), . . . , and D(63).

What is claimed is:

1. An encoding circuit for a digital video signal, comprising:

means for subjecting a digital video signal to a given orthogonal transform to convert the digital video signal into corresponding conversion data;

means for scanning components of the conversion data in a given order to generate a main data sequence from the conversion data;

means for separating the main data sequence into at least two sub data sequences;

means for encoding a first one of the two sub data sequences into corresponding words of a given variable-length code; and means for encoding a second one of the two sub data sequences into corresponding words of the variable-length code, wherein:

said means for separating comprises:

separating means for separating the main data sequence into first and second sub data sequences block by block, the first and second sub data sequences having approximately equal numbers of data pieces per block;

first adding means for adding a number of predetermined dummy data pieces to every block of the first sub data sequence to change the first sub data sequence into a third sub data sequence, wherein the number of predetermined dummy data pieces added to every block of the first sub data sequence and the number of data pieces in every block of the first sub data sequence are equal to each other, and wherein the number of data pieces in every block of the third sub data sequence corresponds to the number of data pieces in every block of the main data sequence; and second adding means for adding predetermined dummy data pieces to every block of the second sub data sequence to change the second sub data sequence into a fourth sub data sequence, wherein the number of predetermined dummy data pieces added to every block of the second sub data sequence and the number of data pieces in every block of the second sub data sequence are equal to each other, and wherein the number of data pieces in every block of the fourth sub data sequence corresponds to the number of data pieces in every block of the main data sequence;

said means for encoding said first one of the two sub data sequences comprises encoding means for encoding the third sub data sequence into corresponding words of a given variable-length code; and said means for encoding said second one of the two sub data sequences comprises encoding means for encoding the fourth sub data sequence into corresponding words of the variable-length code.

2. A decoding circuit for a digital video signal, comprising:

means for decoding words of a given variable-length code into corresponding first and second sub data sequences having a plurality of blocks, wherein every block of the first sub data sequence includes a combination of previously added predetermined dummy data pieces and every block of the second sub data sequence, wherein the number of the previously added predetermined dummy data pieces and a number of data pieces in every block of the second sub data sequence are equal to each other, and wherein the number of data pieces in every block of the first sub data sequence corresponds to a number of data pieces in every block of a main data sequence;

means for decoding words of the variable-length code into corresponding third and fourth sub data sequences having a plurality of blocks, wherein every block of the third sub data sequence includes a combination of previously added predetermined dummy data pieces and every block of the fourth sub data sequence, wherein the number of the previously added predetermined dummy data pieces and a number of data pieces in every block of the fourth sub data sequence are equal to each other, and wherein the number of data pieces in every block of the third sub data sequence corresponds to the number of data pieces in every block of the main data sequence;

means for removing the previously added predetermined dummy data pieces from the first sub data sequence to change the first sub data sequence into the second sub data sequence, for removing the previously added predetermined dummy data pieces from the third sub data sequence to change the third sub data sequence into the fourth sub data sequence, and for combining the second sub data sequence and the fourth sub data sequence into the main data sequence; and means for converting the main data sequence into a corresponding digital video signal.

3. An apparatus for recording image information on a tape via a plurality of recording heads, wherein every unit of the image information is divided and recorded on a plurality of tracks on the tape via the recording heads, the apparatus comprising:

means for subjecting a digital video signal to a given orthogonal transform to convert the digital video signal into corresponding conversion data;

means for scanning components of the conversion data in a given order to generate a main data sequence from the conversion data;

means for separating the main data sequence into at least two sub data sequences;

means for encoding the sub data sequences into at least two encoded data sequences respectively;

means for rearranging the encoded data sequences into at least two final data sequences in correspondence with track scanning by the recording heads so that one of the encoded data sequences which has a component with a lowest order regarding the orthogonal transform will be recorded on a given region of a track on the tape; and means for feeding the final data sequences to the recording heads respectively, wherein said main data sequence includes a plurality of blocks, and said means for separating comprises:

separating means for separating the main data sequence into first and second sub data sequences block by block, the first and second sub data sequences having approximately equal numbers of data pieces per block;

first adding means for adding a number of predetermined dummy data pieces to every block of the first sub data sequence to change the first sub data sequence into a third sub data sequence, wherein the number of the predetermined dummy data pieces added to every block of said first sub data sequence and the number of data pieces in every block of the first sub data sequence are equal to each other, and wherein the number of data pieces in every block of the third sub data sequence corresponds to the number of data pieces in every block of the main data sequence;

second adding means for adding predetermined dummy data pieces to every block of the second sub data sequence to change the second sub data sequence into a fourth sub data sequence, wherein the number of predetermined dummy data pieces added to every block of the second sub data sequence and the number of data pieces in every block of the second sub data sequence are equal to each other, and wherein the number of data pieces in every block of the fourth sub data sequence corresponds to the number of data pieces in every block of the main data sequence;

said means for encoding comprises encoding means for encoding the third and fourth data sequences into two encoded data sequences respectively; and further comprising means for enabling the first and second sub data sequences to contain a component with a lowest order regarding the orthogonal transform.

4. An apparatus for reproducing image information from a tape via a plurality of reproducing heads, the apparatus comprising:

means for rearranging output data sequences from the reproducing heads into two first data sequences;

means for decoding one of the first data sequences into corresponding first and second sub data sequences having a plurality of blocks, wherein every block of the first sub data sequence includes a combination of previously added predetermined dummy data pieces and every block of a second sub data sequence, wherein the number of the previously added predetermined dummy data pieces and a number of data pieces in every block of the second sub-data sequence are equal to each other, and wherein the number of data pieces in every block of the first sub data sequence corresponds to a number of data pieces in every block of a main data sequence;

means for decoding the other of the first data sequences into corresponding third and fourth sub data sequences having a plurality of blocks, wherein every block of the third sub data sequence includes a combination of previously added predetermined dummy data pieces and every block of the fourth sub data sequence, wherein the number of the previously added predetermined dummy data pieces and a number of data pieces in every block of the fourth sub data sequence are equal to each other, and wherein the number of data pieces in every block of the third sub data sequence corresponds to the number of data pieces in every block of the main data sequence;

means for removing the previously added predetermined dummy data pieces from the first sub data sequence to change the first sub data sequence into the second sub data sequence, for removing the previously added predetermined dummy data pieces from the third sub data sequence to change the third sub data sequence into the fourth sub data sequence, and for combining the second sub data sequence and the fourth sub data sequence into the main data sequence; and means for subjecting the main data sequence to a given inverse orthogonal transform to convert the main data sequence into a corresponding digital video signal.

5. A tape on which image information is recorded by an apparatus in a given helical scanning format, the apparatus being operative for recording image information on the tape via a plurality of recording heads, wherein every unit of the image information is divided and recorded on a plurality of tracks on the tape via the recording heads, the apparatus comprising:

means for subjecting a digital video signal to a given orthogonal transform to convert the digital video signal into corresponding conversion data;

means for scanning components of the conversion data in a given order to generate a main data sequence from the conversion data, the main data sequence including a plurality of blocks;

separating means for separating the main data sequence into first and second sub data sequences block by block, the first and second sub data sequences having approximately equal numbers of data pieces per block;

first adding means for adding a number of predetermined dummy data pieces to every block of the first sub data sequence to change the first sub data sequence into a third sub data sequence, wherein the number of the added predetermined dummy data pieces and the number of data pieces in every block of the first sub data sequence are equal to each other, and wherein the number of data pieces in every block of the third sub data sequence corresponds to the number of data pieces in every block of the main data sequence;

second adding means for adding predetermined dummy data pieces to every block of the second sub data sequence to change the second sub data sequence into a fourth sub data sequence, wherein the number of the added predetermined dummy data pieces and the number of data pieces in every block of the second sub data sequence are equal to each other, and wherein the number of data pieces in every block of the fourth sub data sequence corresponds to the number of data pieces in every block of the main data sequence;

encoding means for encoding the third and fourth data sequences into two encoded data sequences respectively;

rearranging means for rearranging the encoded data sequences into two final data sequences in correspondence with track scanning by the recording heads so that one of the encoded data sequences which has a component with a lowest order regarding the orthogonal transform will be recorded on a given region of a track in the tape;

feeding means for feeding the final data sequences to the recording heads respectively; and enabling means for enabling the first and second sub data sequences to contain a component with a lowest order regarding the orthogonal transform.

6. An encoding circuit as recited in claim 1, wherein said means for encoding said first and second sub data sequences into said corresponding words of said given variable-length code are configured to provide parallel processing of the conversion data transformed by said means for subjecting, thereby reducing loss of information represented thereby and improving image quality.

7. An apparatus as recited in claim 3, wherein said means for encoding said sub data sequences and said means for rearranging said encoded data sequences are configured to provide parallel processing of the conversion data transformed by said means for subjecting, thereby reducing loss of information represented thereby and improving image quality.

* * * * *